US009524242B2

(12) United States Patent
Jain et al.

(10) Patent No.: US 9,524,242 B2
(45) Date of Patent: Dec. 20, 2016

(54) CACHE MEMORY SYSTEM WITH SIMULTANEOUS READ-WRITE IN SINGLE CYCLE

(71) Applicant: STMicroelectronics International N.V., Amsterdam (NL)

(72) Inventors: Piyush Jain, Ghaziabad (IN); Harsh Rawat, Haryana (IN); Gangaikondan Subramani Visweswaran, New Delhi (IN)

(73) Assignee: STMICROELECTRONICS INTERNATIONAL N.V., Amsterdam (NL)

( * ) Notice: Subject to any disclaimer, the term of this patent is extended or adjusted under 35 U.S.C. 154(b) by 334 days.

(21) Appl. No.: 14/166,003

(22) Filed: Jan. 28, 2014

(65) Prior Publication Data
US 2015/0212945 A1 Jul. 30, 2015

(51) Int. Cl.
*G06F 12/08* (2016.01)

(52) U.S. Cl.
CPC ... *G06F 12/0864* (2013.01); *G06F 2212/6032* (2013.04)

(58) Field of Classification Search
None
See application file for complete search history.

(56) References Cited

U.S. PATENT DOCUMENTS

| 5,564,034 A * | 10/1996 | Miyake | G06F 12/0864 |
| | | | 711/128 |
| 6,138,209 A * | 10/2000 | Krolak | G06F 12/0864 |
| | | | 711/122 |
| 8,250,300 B2 | 8/2012 | Visalli et al. | |
| 8,583,872 B2 | 11/2013 | Yamamura et al. | |
| 2005/0010724 A1 | 1/2005 | Cofler | |
| 2011/0310691 A1* | 12/2011 | Zhou | G11C 8/16 |
| | | | 365/230.03 |
| 2012/0054437 A1* | 3/2012 | Huang | G06F 3/0613 |
| | | | 711/118 |

* cited by examiner

*Primary Examiner* — Ryan Bertram
*Assistant Examiner* — Tracy Chan
(74) *Attorney, Agent, or Firm* — Gardere Wynne Sewell, LLP

(57) ABSTRACT

A cache includes a number of cache ways each having tag memory fields and corresponding data fields. With a simultaneous read-write operation defined by a read memory address (read tag portion and read index portion) and a write memory address (write tag portion and write index portion), the cache determines a read cache hit and reads from one cache way as indicated by the read tag and index portions of the read memory address. Furthermore, a determination is made as to whether a write as indicated by the write tag and index portions of the write memory address would be made in a same one cache way as the read so as to be in conflict. If such a conflict exists, the write is instead effectuated, simultaneously with the read to the one cache way, to a different cache way than is used for the read.

48 Claims, 17 Drawing Sheets

CACHE MEMORY SYSTEM WITH SIMULTANEOUS READ-WRITE IN SINGLE CYCLE

TECHNICAL FIELD

The present invention relates to cache memory systems.

BACKGROUND

Reference is now made to FIG. 1 which illustrates a block diagram of a conventional cache memory 10. The memory is formed of a plurality of cache ways 12. In the example of FIG. 1, there are two cache ways 12(1) and 12(2). Thus, FIG. 1 illustrates a cache memory of the two-way set associative type as known to those skilled in the art. Each cache way 12 is formed of a plurality of cache blocks 14. There may exist n cache blocks 14 in each cache way 12 (i.e., blocks 14(1)-14(n)). Each block 14 includes a validity flag 16, a tag field 18 and a data field 20. The validity flag may, for example, comprise a size of one bit, the tag field may comprise, for example, a size of fifteen bits, and the data field may comprise, for example, a size of 128 bytes. The overall size of the cache memory 10 is calculated as the size of the cache block 14 times the number of cache blocks (n) times the number of cache ways 12.

The cache memory 10 is typically coupled to a processing system which utilizes an address 22 for memory access. The address 22 may be divided into a tag portion 24, an index portion 26 and an offset portion 28. The data within the index portion 26 of the address 22 specifies a block 14 number. The cache memory responds to the index portion 26, for example with an index value of i (in the illustrated example, i=2), by accessing the cache memory 10 at the corresponding cache block 14(i) in each of the cache ways 12.

Turning first to a read operation, comparator circuitry 30 functions to compare the data within the tag portion 24 of the address 22 to the data stored in the tag field 18 of the corresponding cache block 14(i) in each of the cache ways 12. A cache hit is indicated when the comparison is a match. In response to a match for a particular one of the cache ways 12, and assuming the validity flag 16 indicates that the data is valid, the data from the data field 20 for the cache block 14(i) in the matching one of the cache ways 12 is read out of the memory 10. If the comparator circuitry 30 fails to find a tag match, a cache miss is indicated and the cache memory 10 is bypassed.

With respect to a write operation, the memory 10 selects one of the cache ways 12 whose tag field 18 is vacant, or whose validity flag 16 indicates invalidity, and the data is written into the data field 20 of the corresponding cache block 14(i) of the selected cache way 12 and the data within the tag portion 24 of the address 22 is written into the tag field 18. In the event the cache blocks 14(i) in both cache ways 12 are occupied with valid cached data, the memory will evict data from one of the cache ways 12 to make room for the current data write. The eviction may, for example, be based on the least recently used algorithm known in the art.

The basic principal of two-way set associative cache memory configurations is that there are always two locations (one in each cache way 12 as specified by the index value of the address) for a given location in the main memory. If one of the locations is already occupied with valid data, then the other location is available. A limitation in operation occurs, however, when both locations are occupied with valid data. In such a situation, one of the locations must be overwritten using a suitable replacement algorithm. Overwriting the current contents is a multi-cycle operation because of the need to perform hit/miss detection and then perform fetch and write operations.

There is accordingly a need in the art to improve cache performance.

SUMMARY

In an embodiment, a cache memory comprises: an N-way set-associative memory structure including N cache ways, each cache way comprising a plurality of tag memory fields and a corresponding plurality of data fields; a control circuit including multiplexing circuitry coupled to the data fields, said control circuit configured to operate, in an instance of a simultaneous read-write operation defined by a read memory address including a read tag portion and an read index portion and a write memory address including a write tag portion and a write index portion, to: determine a cache hit and control the multiplexing circuitry to effectuate a read from one of the cache ways of the memory structure as indicated by the read tag portion and an read index portion of the read memory address; determine whether a write to the memory structure as indicated by the write tag portion and a write index portion of the write memory address would be made in a same one of the cache ways as the read so as to be in conflict; and with such conflict, control the multiplexing circuitry to effectuate the write, simultaneously with the read to said one of the cache ways, to a different cache way than is used for the read.

In an embodiment, a cache memory management method is provided for a cache memory having an N-way set-associative memory structure including N cache ways, each cache way comprising a plurality of tag memory fields and a corresponding plurality of data fields. The method comprises, in an instance of a simultaneous read-write operation defined by a read memory address including a read tag portion and an read index portion and a write memory address including a write tag portion and a write index portion: determining a cache hit and effectuating a read from one of the cache ways of the memory structure as indicated by the read tag portion and an read index portion of the read memory address; determining whether a write to the memory structure as indicated by the write tag portion and a write index portion of the write memory address would be made in a same one of the cache ways as the read so as to be in conflict; and with such conflict, effectuating the write, simultaneously with the read to said one of the cache ways, to a different cache way than is used for the read

BRIEF DESCRIPTION OF THE DRAWINGS

FIG. 16 is a more detailed block diagram of the cache memory of FIG. 3 with circuitry for providing a configurable memory space;

DETAILED DESCRIPTION OF THE DRAWINGS

Figure 2:
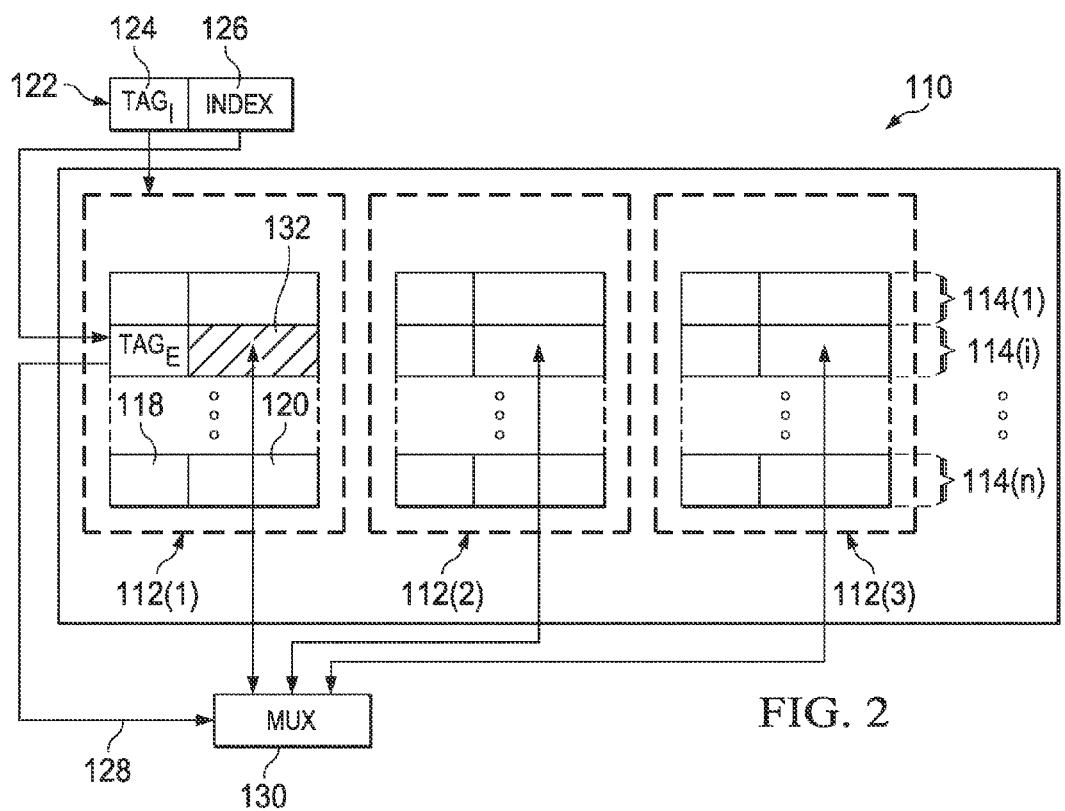
FIG. 2 is a block diagram of a cache memory in accordance with an embodiment.

Reference is now made to FIG. 2 which illustrates a block diagram of a cache memory 110 in accordance with an embodiment. The memory is formed of a plurality of cache ways 112 in particular comprising three cache ways 112(1), 112(2) and 112(3). Thus, FIG. 2 illustrates a cache memory of the three-way set associative type. Each cache way 112 is formed of a plurality of cache blocks 114. There may exist n cache blocks 114 in each cache way 112 (i.e., blocks 114(1)-114(n)). Each cache block 114 includes a tag field 118 and a data field 120.

Figure 1:
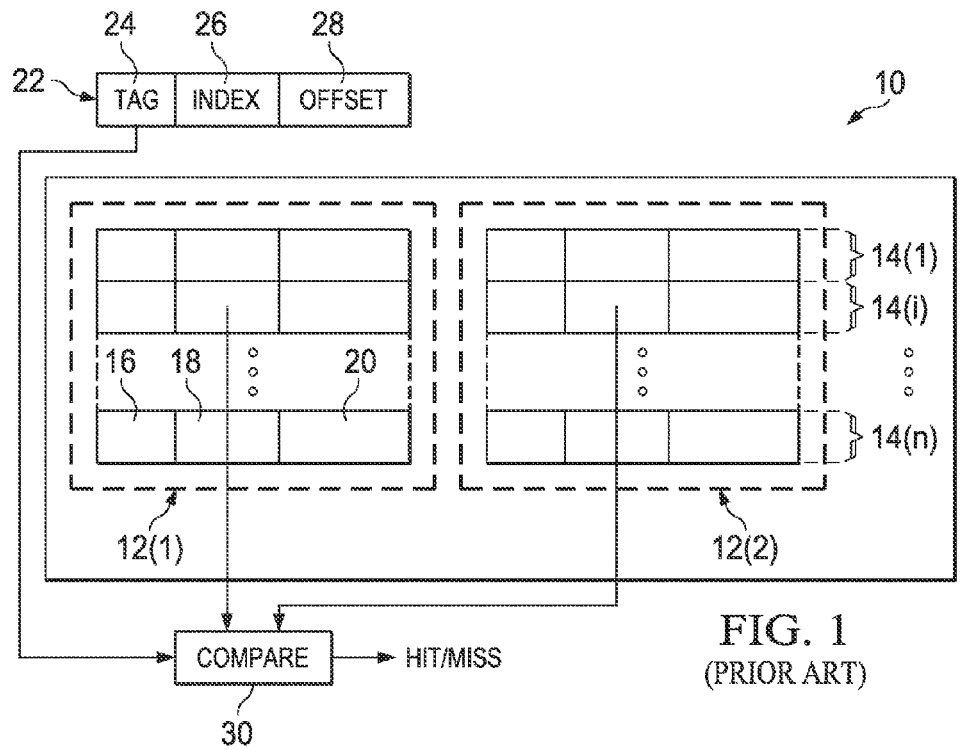
FIG. 1 is a block diagram of a conventional cache memory.

The tag field may comprise, for example, a size of two bits, and the data field may comprise, for example, a size of 4 bytes. The overall size of the cache memory 110 is calculated as the size of the cache block 114 times the number of cache blocks (n) times the number of cache ways 112. However, the effective size of the cache memory 110 is smaller and is equal to the size of a two-way set associative cache (like FIG. 1) because the third set in FIG. 2 is provided to support contention handling during instances of simultaneous read-write access as will be discussed in detail below.

The cache memory 110 is typically coupled to a processing system which utilizes an address 122 for memory access. The address 122 may be divided into a tag portion 124 and an index portion 126.

The data within the tag portion 124 is referred to as the incoming tag ($TAG_I$). The incoming tag ($TAG_I$) value is used to select one of the sets (i.e., one of the cache ways 112) within the cache memory 110. In a preferred implementation, the size of the tag portion 124 is a single bit and thus the incoming tag ($TAG_I$) value is either logic 0 or logic 1. With this configuration, the tag portion 124 of the address 122 can select either the first cache way 112(1) or the second cache way 112(2) depending on the logic state (0 or 1, respectively) of the incoming tag ($TAG_I$) value.

The tag fields 118 of the cache memory 110 form a TAG memory. Each tag field 118 stores an encoded tag ($TAG_E$). When the cache memory 110 is initialized, the encoded tag ($TAG_E$) values are set equal to the set number (i.e., the number of the cache way 112). As discussed above, in a preferred implementation the size of each tag field is two bits. Thus, the tag fields 118 within the first cache way 112(1) are initialized with encoded tag ($TAG_E$) values of 1 (data value "00"), the tag fields 118 within the second cache way 112(2) are initialized with encoded tag ($TAG_E$) values of 2 (date value "01"), and the tag fields 118 within the third cache way 112(3) are initialized with encoded tag ($TAG_E$) values of 3 (data value "10"). The value of the stored encoded tag ($TAG_E$) is accordingly a unique set identification (ID) of the set (set 1, 2 or 3) into which the addressed data physically resides.

The data within the index portion 126 of the address 122 specifies a cache block 114 number. The cache memory responds to the index portion 126 by accessing the cache memory 110 at the corresponding cache block 114 across each of the cache ways 112. This is illustrated in an exemplary fashion in FIG. 2 with the selection, based on an index value of i=2 (data value "01"), of the cache block 114(i).

The data within the tag portion 124 (incoming tag ($TAG_I$)) of the address 122 specifies one of the first cache way 112(1) (with an incoming tag ($TAG_I$) data value of "0") or the second cache way 112(2) (with an incoming tag ($TAG_I$) data value of "1"). The cache memory responds to the tag portion 124 by accessing the selected cache way 112 of the cache memory 110. This is illustrated in an exemplary fashion in FIG. 2 with the selection, based on an incoming tag ($TAG_I$) value 1 (data value "0"), of the cache way 112(1).

The encoded tag ($TAG_E$) value stored at the tag field 118 within the cache block 114(i) for the selected cache way 112(1) is then provided (reference 128) to a multiplexing circuit 130. The multiplexing circuitry 130 functions to select, in response to the encoded tag ($TAG_E$) value, one of the data fields 120 from the cache block 114(i) for either read or write. For example, if the encoded tag ($TAG_E$) value is 1 (data value "00") then selection is made of the data field 120 within the selected cache block 114(i) of the first cache way 112(1). If the encoded tag ($TAG_E$) value is instead 2 (data value "01") then the multiplexing circuit 130 would select the data field 120 within the selected cache block 114(i) of the second cache way 112(2). Alternatively, if the encoded tag ($TAG_E$) value is 3 (data value "10") then selection would be made by the multiplexer circuit 130 of the data field 120 within the selected cache block 114(i) of the third cache way 112(3). This is illustrated in an exemplary fashion in FIG. 2 with the selection, based on an index value of i=2 (data value "01") and an encoded tag ($TAG_E$) value of 1 (data value "00"), of the cross-hatched 132 data field 120 from cache block 114(i) in cache way 112(1).

Thus, in a read operation, the tag portion 124 (incoming tag ($TAG_I$)) and index portion 126 of the address 122 are used to identify a particular tag field 118 within a particular cache block 114. With this operation, an encoded tag ($TAG_E$) value is obtained from the particular tag field 118 for use as a selection signal controlling multiplexer circuit 130 operation to access a particular data field 120 of the cache memory 110 in order to read the data stored therein.

Likewise, in a write operation, the tag portion 124 (incoming tag ($TAG_I$)) and index portion 126 of the address 122 are used to identify a particular tag field 118 within a particular cache block 114. With this operation, an encoded tag ($TAG_E$) value is obtained from the particular tag field 118 for use as a selection signal controlling multiplexer circuit 130 operation to access a particular data field 120 of the cache memory 110 in order to write data therein.

It is further recognized that some processing systems coupled to cache memory 110 may support separate read and write addressing, for example, in connection with providing simultaneous read-write operations. In such an implementation, the address 122 will comprise a read address (RA)

122R and a write address (WA) 122W. Each of the read and write addresses will include a tag portion 124 and an index portion 126 as discussed above. Furthermore, the general operations described above for read and write will be performed in the same manner except that the read operation will consider only the data of the read address 122R and the write operation will consider only the data of the write address 122W in terms of identifying a particular tag field 118, obtaining the encoded tag ($TAG_E$) value and controlling the multiplexer circuit 130 selection of the data field 120 of the cache memory 110.

This raises a concern with respect to the possibility of a conflicting simultaneous access for read and write. The cache memory 110 with multiplexing circuit 130 is configured to handle the possible conflict and support simultaneous read-write in a single cycle.

Figure 3:
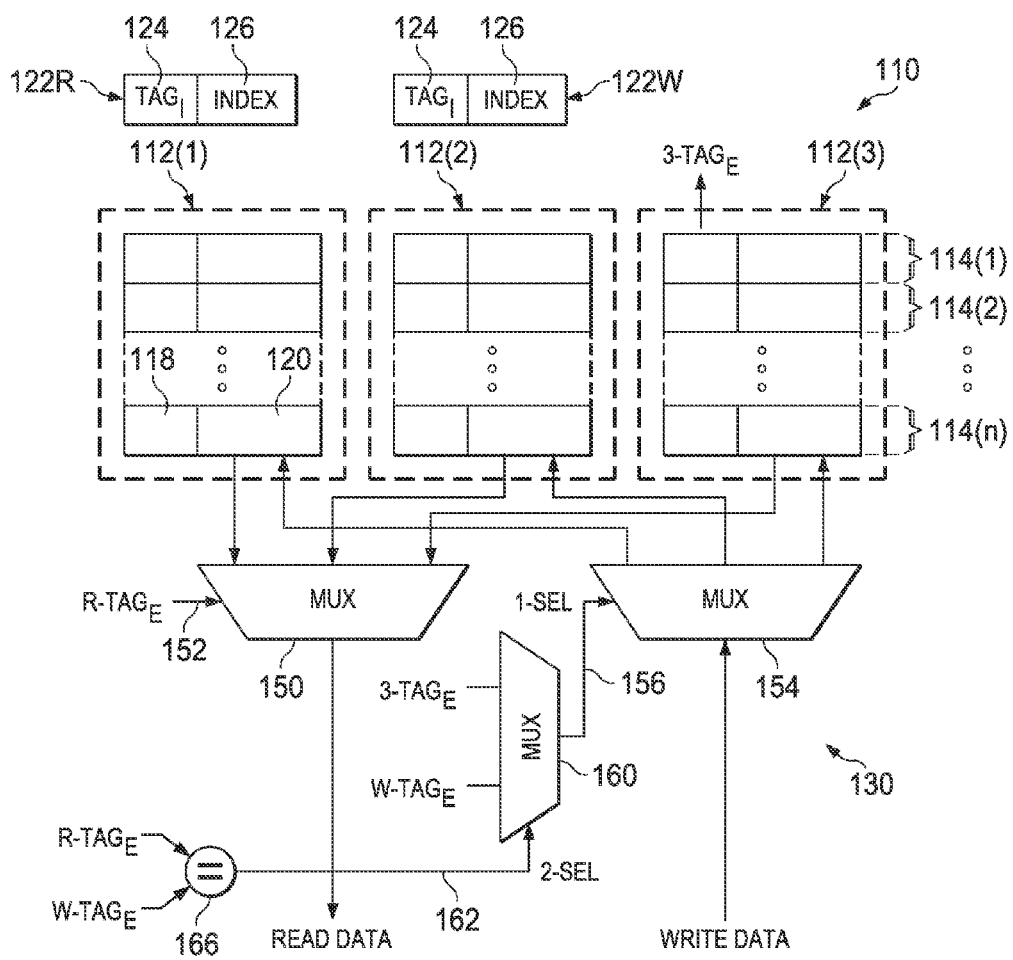
FIG. 3 is a more detailed block diagram of the cache memory of FIG. 2.

Reference is now made to FIG. 3 which illustrates a block diagram of the cache 110 of FIG. 2 with details of the multiplexing circuit 130.

The multiplexing circuit 130 includes a read multiplexer 150 including inputs from each of the cache ways 112 and an output configured to provide read data. More particularly, the inputs are coupled to the data fields 120, and the read data is data read from the data fields 120. The read multiplexer 150 includes a selection input 152 configured to receive a read encoded tag ($R\text{-}TAG_E$) value. As discussed above, in the read operation the tag portion 124 (incoming tag ($TAG_I$)) and index portion 126 of the read address 122R are used to identify a particular tag field 118 within a particular cache block 114. The encoded tag ($TAG_E$) value obtained from the particular tag field 118 during the read is thus the read encoded tag ($R\text{-}TAG_E$) value.

The multiplexing circuit further includes a write multiplexer 154 including an input configured to receive write data and outputs coupled to each of the cache ways 112. More particularly, the outputs are coupled to the data fields 120, and the write data is data to be written to the data fields 120. The write multiplexer 154 includes a selection input 156 configured to receive a first selection signal 1-SEL. The first selection signal 1-SEL is output from a selection multiplexer 160 which includes inputs configured to receive a write encoded tag ($W\text{-}TAG_E$) value and a third set encoded tag ($3\text{-}TAG_E$) value. As discussed above, in the write operation the tag portion 124 (incoming tag ($TAG_I$)) and index portion 126 of the write address 122W are used to identify a particular tag field 118 within a particular cache block 114. The encoded tag ($TAG_E$) value obtained from the particular tag field 118 during the write is thus the write encoded tag ($W\text{-}TAG_E$) value. The third set encoded tag ($3\text{-}TAG_E$) value is the encoded tag ($TAG_E$) value obtained from the tag field 118 (of the write selected cache block 114) in the third set (i.e., third cache way 112(3)) during the write.

The selection multiplexer 160 includes a selection input 162 configured to receive a second selection signal 2-SEL. The second selection signal 2-SEL is output from a comparator circuit 166 that functions to compare the read encoded tag ($R\text{-}TAG_E$) value with the write encoded tag ($W\text{-}TAG_E$) value. When the read encoded tag ($R\text{-}TAG_E$) value matches the write encoded tag ($W\text{-}TAG_E$) value, the comparator circuit 166 sets the logic value of the second selection signal 2-SEL to cause the selection multiplexer 160 to pass the third set encoded tag ($3\text{-}TAG_E$) value as the first selection signal 1-SEL. Conversely, when the read encoded tag ($R\text{-}TAG_E$) value does not match the write encoded tag ($W\text{-}TAG_E$) value, the comparator circuit 166 sets the logic value of the second selection signal 2-SEL to cause the selection multiplexer 160 to pass the write encoded tag ($W\text{-}TAG_E$) value as the first selection signal 1-SEL.

In non-conflicting simultaneous read-write conditions, the write operation is as discussed above with the location of the cache write being specified by the write encoded tag ($W\text{-}TAG_E$) value because the selection multiplexer 160 will pass the write encoded tag ($W\text{-}TAG_E$) value as the first selection signal 1-SEL. However, when a conflicting simultaneous read-write condition arises (i.e., when the read encoded tag ($R\text{-}TAG_E$) value matches the write encoded tag ($W\text{-}TAG_E$) value), the location of the cache write is instead specified by the third set encoded tag ($3\text{-}TAG_E$) value because the selection multiplexer 160 will pass the third set encoded tag ($3\text{-}TAG_E$) value as the first selection signal 1-SEL.

Figure 4:
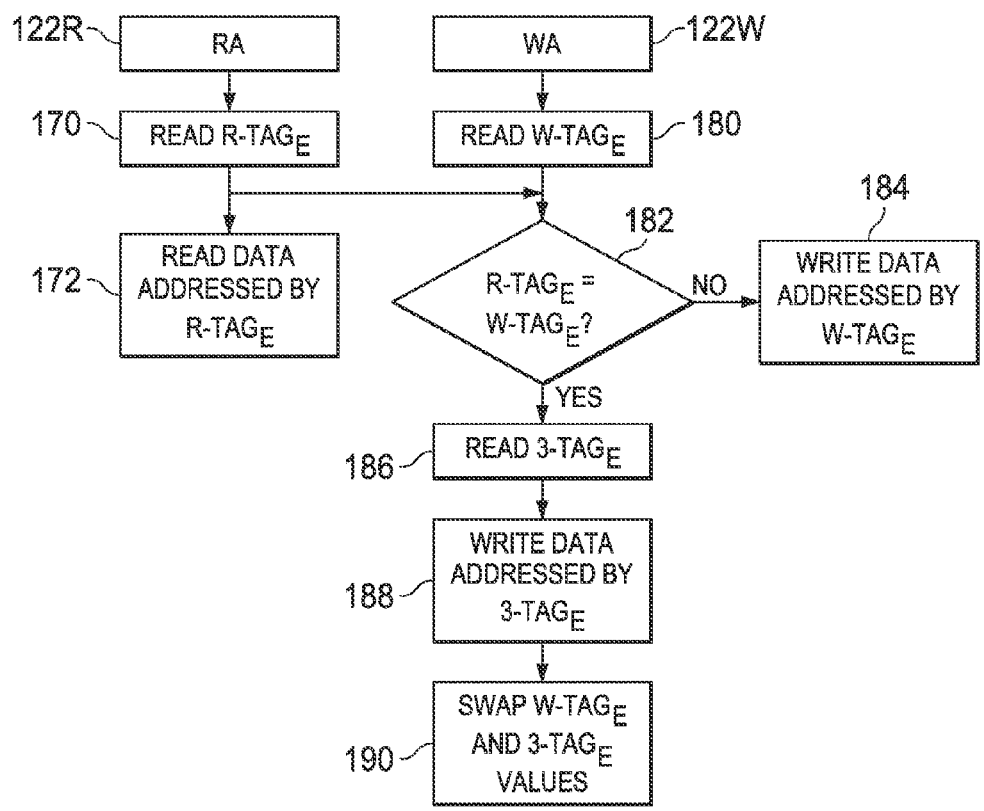
FIG. 4 illustrates a flow diagram for operation of the cache memory.

Reference is now made to FIG. 4 which illustrates a flow diagram for operation of the cache memory 110. The read address (RA) 122R is received and in step 170 the cache operates to read the read encoded tag ($R\text{-}TAG_E$) value from the tag field 118 within cache block 114 which is identified from the tag portion 124 (incoming tag ($TAG_I$)) and index portion 126 of the read address 122R. In step 172, the read operation is completed by reading the data from the data field 120 of the cache way 112 addressed by the read encoded tag ($R\text{-}TAG_E$) value.

The write address (WA) 122W is also received and in step 180 the cache operates to read the write encoded tag ($W\text{-}TAG_E$) value from the tag field 118 within cache block 114 which is identified from the tag portion 124 (incoming tag ($TAG_I$)) and index portion 126 of the write address 122W. A test is then made in step 182 as to whether the read encoded tag ($R\text{-}TAG_E$) value matches the write encoded tag ($W\text{-}TAG_E$) value. This is the operation performed by the comparator circuit 166 to generate the second selection signal 2-SEL.

If the read encoded tag ($R\text{-}TAG_E$) value does not match the write encoded tag ($W\text{-}TAG_E$) value (NO at step 182), then no read-write conflict is present and the write operation is completed by writing the data to the data field 120 of the cache way 112 addressed by the write encoded tag ($W\text{-}TAG_E$) value.

Conversely, if the read encoded tag ($R\text{-}TAG_E$) value does match the write encoded tag ($W\text{-}TAG_E$) value (YES at step 182), then a read-write conflict is present and at step 186 the third set encoded tag ($3\text{-}TAG_E$) value is read from the third set (third cache way 112(3)). More particularly, the cache operates to read the third set encoded tag ($3\text{-}TAG_E$) value from the tag field 118 within cache block 114 (of the third cache way 112) identified by the index portion 126 of the write address 122W. In step 188, the write operation is completed by writing the data to the data field 120 of the cache way 112 addressed by the third set encoded tag ($3\text{-}TAG_E$) value. Lastly, in step 190, the cache causes the tag fields 118 first or second set (first or second cache ways 112(1) or 112(2)) and third set (third cache way 112(3)) to swap their write encoded tag ($W\text{-}TAG_E$) value and third set encoded tag ($3\text{-}TAG_E$) value. This is necessary to ensure that the cache keeps track of the set to which the data of the conflicting write operation was written.

The operation described above, especially in the context of a conflicting simultaneous read-write condition, may be better understood by reference to a specific example. It will be understood that the illustrated specifics are exemplary in nature only and that some simplification of cache size and configuration is presented in order to facilitate understanding of the operation.

Figure 5A:
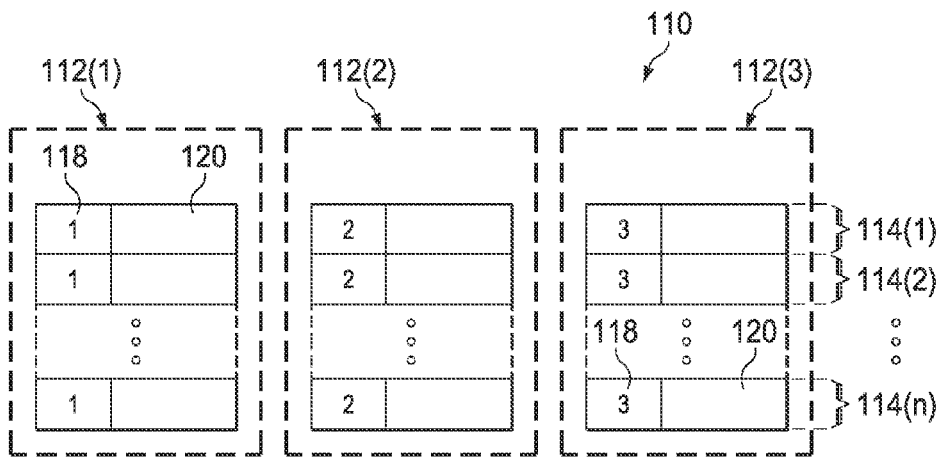
FIGS. 5A to 5E illustrate various read and/or write operations for the cache memory in accordance with the flow diagram of FIG. 4.

FIG. 5A shows an initial condition of the cache 110 prior to a read and/or write operation. It will be noted that values in the tag fields 118 correspond to the number of the set (i.e., the number of the cache way 112). Thus, for example, all tag fields 118 in cache way 112(1) have a value of 1 (data value "00"), all tag fields 118 in cache way 112(2) have a value of 2 (data value "01") and all tag fields 118 in cache way 112(3) have a value of 3 (data value "10").

Figure 5B:
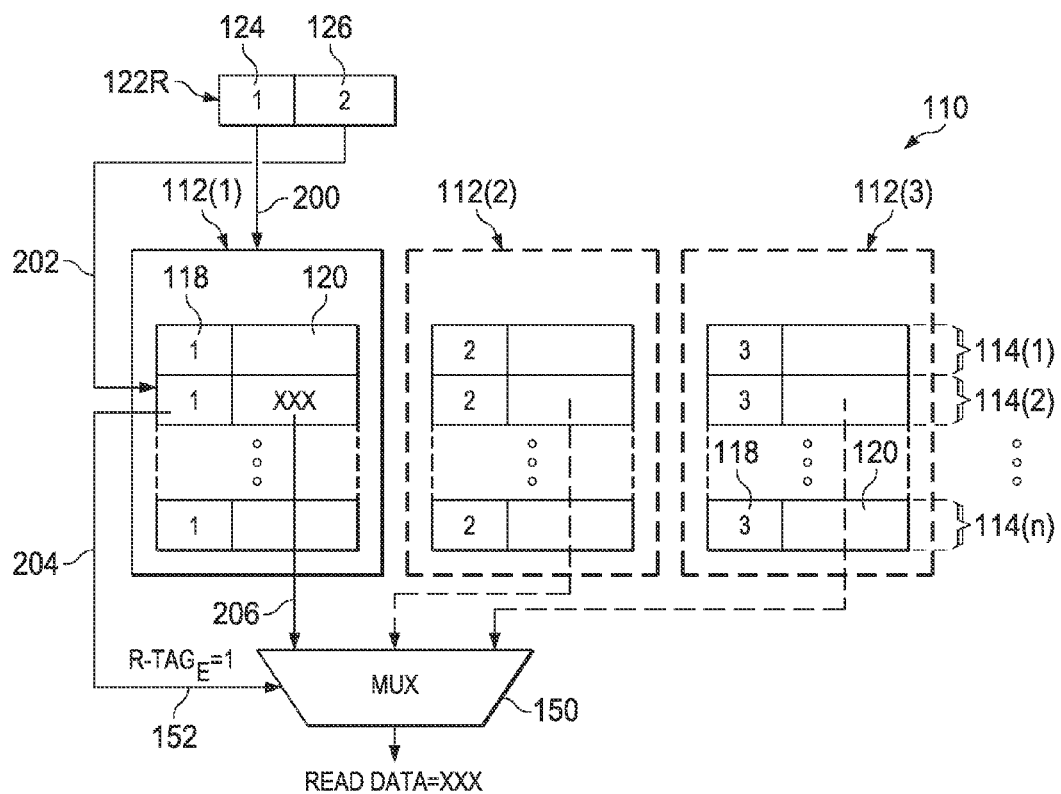

FIG. 5B illustrates a read only operation. The read address (RA) 122R is received. The tag portion 124 (incoming tag (TAG$_I$) value=1, data value "00") indicates that the first set (first cache way 112(1)) has been selected. This is indicated at reference 200 and by a solid line box drawn around cache way 112(1) in FIG. 5B. The index portion 126 of the read address 122R (having a value of 2, data value "01") indicates that the second cache block 114(2) has been selected (reference 202). As a result, a selection (reference 204) of the tag field 118 for the second cache block 114(2) in the first cache way 112(1) is made, that tag field holding the read encoded tag (R-TAG$_E$) value (in this example, equal to 1, data value "00"). The read encoded tag (R-TAG$_E$) value is applied to the selection input 152 of read multiplexer 150. With a value equal to 1, this will cause the read multiplexer 150 to select the first set (first cache way 112(1)) for the read operation (reference 206, reading out the data value of XXX).

Figure 5C:
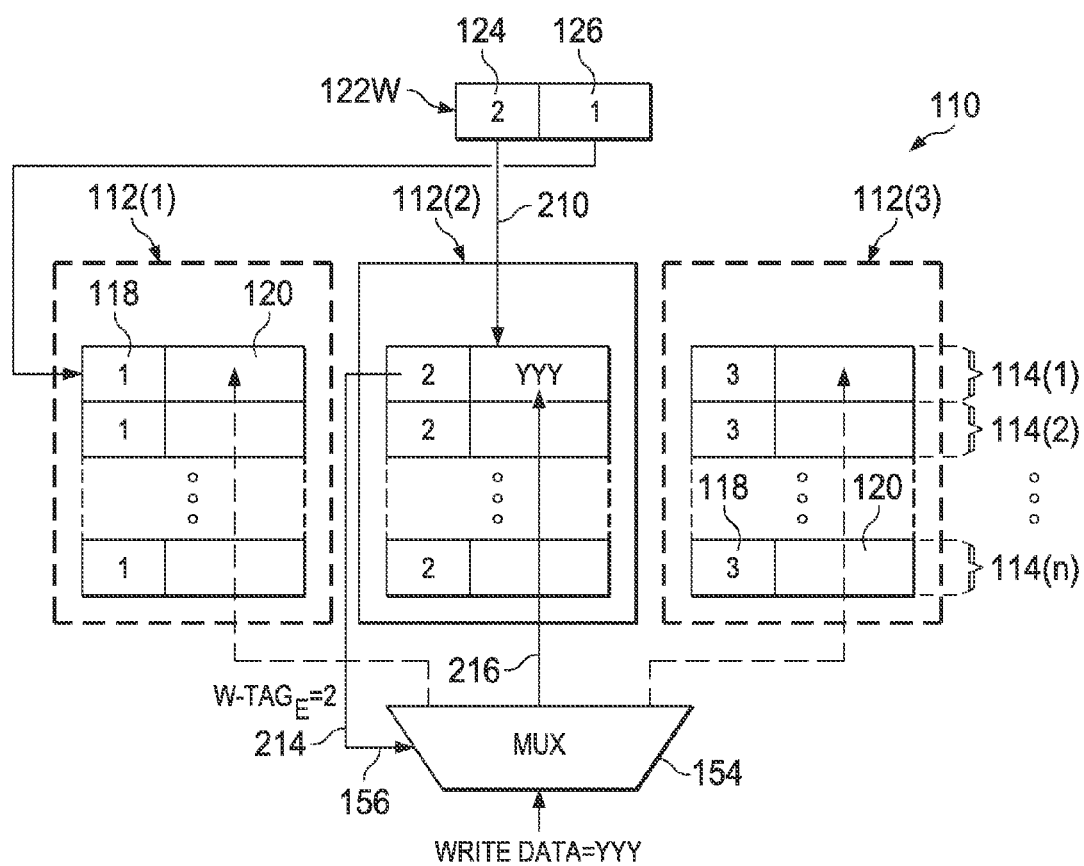

FIG. 5C illustrates a write only operation. The write address (WA) 122R is received. The tag portion 124 (incoming tag (TAG$_I$) value=2, data value "01") indicates that the second set (second cache way 112(2)) has been selected. This is indicated at reference 210 and by a solid line box drawn around cache way 112(2) in FIG. 5C. The index portion 126 of the write address 122W (having a value of 1, data value "00") indicates that the first cache block 114(1) has been selected (reference 212). As a result, a selection (reference 214) of the tag field 118 for the first cache block 114(1) in the second cache way 112(2) is made, that tag field holding the write encoded tag (W-TAG$_E$) value (in this example, equal to 2, data value "01"). The write encoded tag (W-TAG$_E$) value is applied to the selection input 156 of write multiplexer 154 (through the multiplexer 160, not shown to simplify the illustration, see FIG. 3 for more detail where the second selection signal 2-SEL selects the write encoded tag (W-TAG$_E$) input to multiplexer 160). With a value equal to 2, this will cause the write multiplexer 154 to select the second set (second cache way 112(2)) for the write operation (reference 216, writing in the data value of YYY).

The descriptions and illustrations of FIGS. 5B and 5C further illustrate the operations with respect to a simultaneous read-write operation with no conflict. In this case, the read encoded tag (R-TAG$_E$) value (equal to 1) does not match the write encoded tag (W-TAG$_E$) value (equal to 2).

Figure 5D:
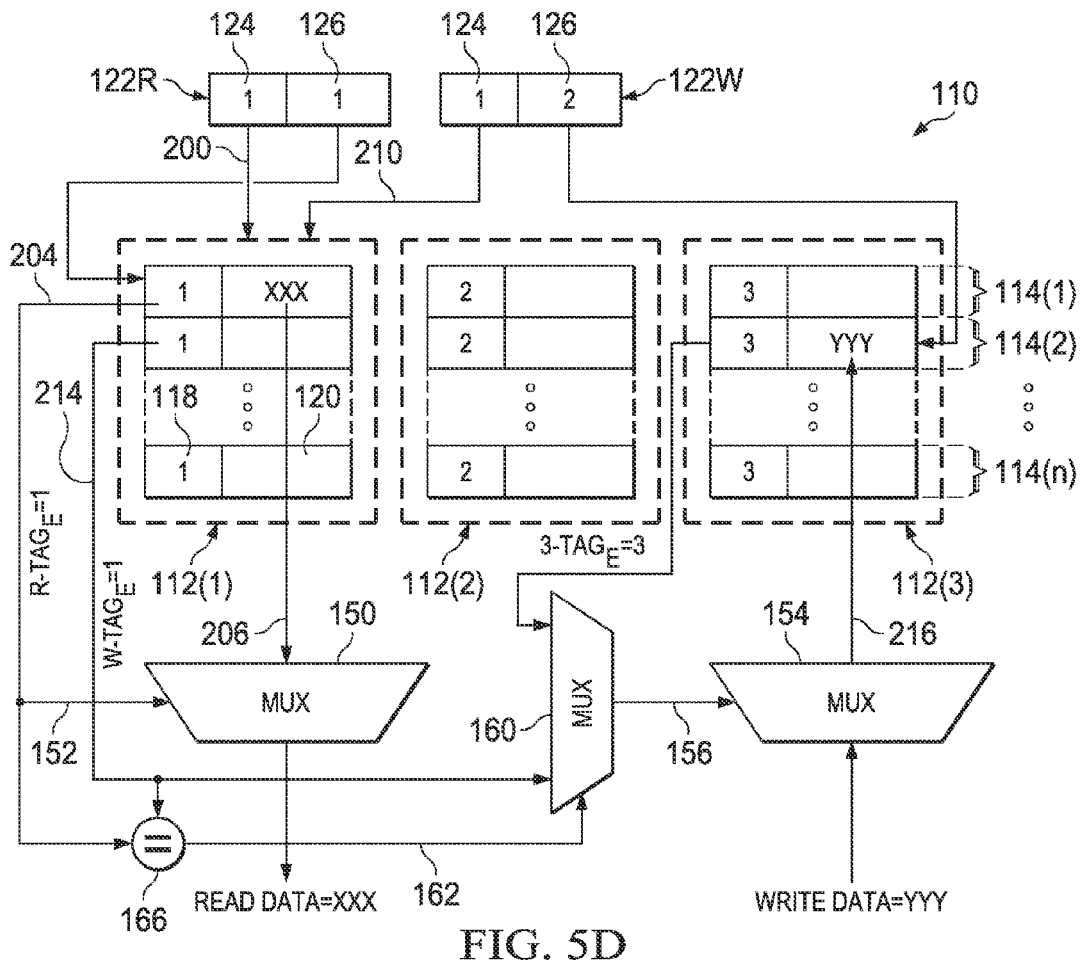

FIG. 5D illustrates a simultaneous read-write operation with conflict. The read address (RA) 122R and write address (WA) 122R are received.

For the read address 122R, the tag portion 124 (incoming tag (TAG$_I$) value=1, data value "00") indicates that the first set (first cache way 112(1)) has been selected. This is indicated at reference 200. The index portion 126 of the read address 122R (having a value of 1, data value "00") indicates that the first cache block 114(1) has been selected (reference 202). As a result, a selection (reference 204) of the tag field 118 for the first cache block 114(1) in the first cache way 112(1) is made, that tag field holding the read encoded tag (R-TAG$_E$) value (in this example, equal to 1, data value "00"). The read encoded tag (R-TAG$_E$) value is applied to the selection input 152 of read multiplexer 150. With a value equal to 1, this will cause the read multiplexer 150 to select the first set (first cache way 112(1)) for the read operation (reference 206, reading out the data value of XXX).

For the write address 122W, the tag portion 124 (incoming tag (TAG$_I$) value=1, data value "00") indicates that the first set (first cache way 112(1)) has been selected. This is indicated at reference 210. The index portion 126 of the write address 122W (having a value of 2, data value "01") indicates that the second cache block 114(2) has been selected (reference 212). As a result, a selection (reference 214) of the tag field 118 for the second cache block 114(2) in the first cache way 112(1) is made, that tag field holding the write encoded tag (W-TAG$_E$) value (in this example, equal to 1, data value "00"). Furthermore, a selection (reference 220) of the tag field 118 for the second cache block 114(2) in the third cache way 112(3) is made, that tag field holding the third set encoded tag (3-TAG$_E$) value (in this example, equal to 3, data value "10").

The comparator circuit 166 compares the values of the read encoded tag (R-TAG$_E$) and the write encoded tag (W-TAG$_E$). In this case, the values match (i.e., both are equal to 1) and this indicates a conflicting read-write operation because both the read and the write operation would be simultaneously trying to access a same set (in this instance the first cache way 112(1)). The second selection signal 2-SEL accordingly has a logic value indicative of the conflict. This signal is applied to the selection input 162 of the selection multiplexer 160 which responds by selecting the third set encoded tag (3-TAG$_E$) value (equal to 3, data value "10") for application to the selection input 154 of the write multiplexer 154 as the first selection signal 1-SEL. With a value equal to 3, this will cause the write multiplexer 154 to select the third set (third cache way 112(3)) for the write operation (reference 216, writing in the data value of YYY).

Figure 5E:
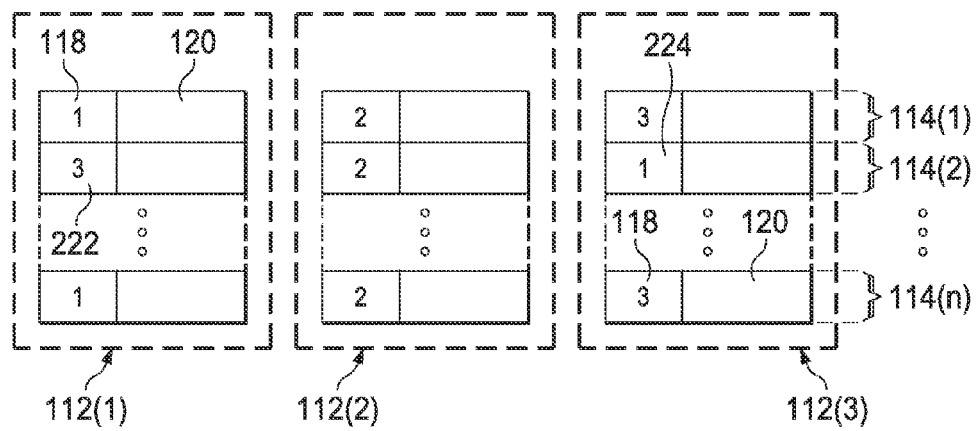

FIG. 5E shows a final condition of the cache 110 after the simultaneous read-write operation with conflict is completed. As noted in step 190 of FIG. 4, the write encoded tag (W-TAG$_E$) value and third set encoded tag (3-TAG$_E$) value must be swapped when such a conflict arises. Thus, reference 222 indicates that the tag field 118 for the second cache block 114(2) in the first cache way 112(1) (which previously held the write encoded tag (W-TAG$_E$) value=1, data value "00") now stores a value of 3 (data value "10") which was the third set encoded tag (3-TAG$_E$) value from the tag field 118 for the second cache block 114(2) in the third cache way 112(3). Also, reference 224 indicates that the tag field 118 for the second cache block 114(2) in the third cache way 112(3) (which previously held the third set encoded tag (3-TAG$_E$) value=3, data value "10") now stores a value of 1 (data value "00") which was the write encoded tag (W-TAG$_E$) value from the tag field 118 for the second cache block 114(2) in the first cache way 112(1).

Figure 6:
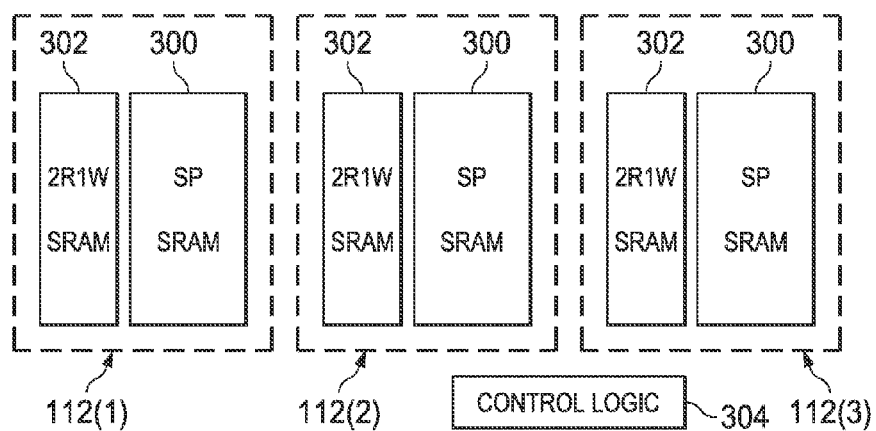
FIG. 6 is an architecture and block diagram for the cache of FIG. 2.

Reference is now made to FIG. 6 which illustrates an architecture and block diagram for the cache of FIG. 2. Each cache way 112 is formed of a single port SRAM 300 (used for the data fields 120) and a simultaneous 2R1W port (two read port, one write port) SRAM 302 (sued for the tag fields 118). A 2R1W port memory is needed because the cache must support a read from the tag fields 118 of the encoded tag (TAG$_E$) value during read, a read from the tag fields 118 of the encoded tag (TAG$_E$) value during write, and a write to the tag fields 118 of the encoded tag (TAG$_E$) value during write and for supporting tag swap at instances of read-write conflict. The cache further includes a control logic circuit 304 implementing the multiplexing circuitry 130 and functions associated with cache operation as described herein.

The cache memory 110 of FIG. 2 has the following initialization requirements: at power-up the portion of the cache providing the tag memory must be initialized to a predefined state where the encoded tags values provide a unique set identification for each word. An example of this is shown in FIG. 5A with the encoded tag values set to 1 for set 1, 2 for set 2 and 3 for set 3. If the tag memory is built from RAM, then an M cycle (where M is the depth of the memory) process is performed to initialize the complete tag memory. The effort (in terms of area and power) required for initialization is directly proportional to the depth of the tag memory and the width of the tag data, which increase with associativity count and memory word count. The tag memory can be implemented using flip-flop technology, and this permits initialization to occur through set and reset operations. The use of such flip-flops for the tag memory permits a faster initialization which can be performed in connection with the power-up sequence of the cache.

Figure 7:
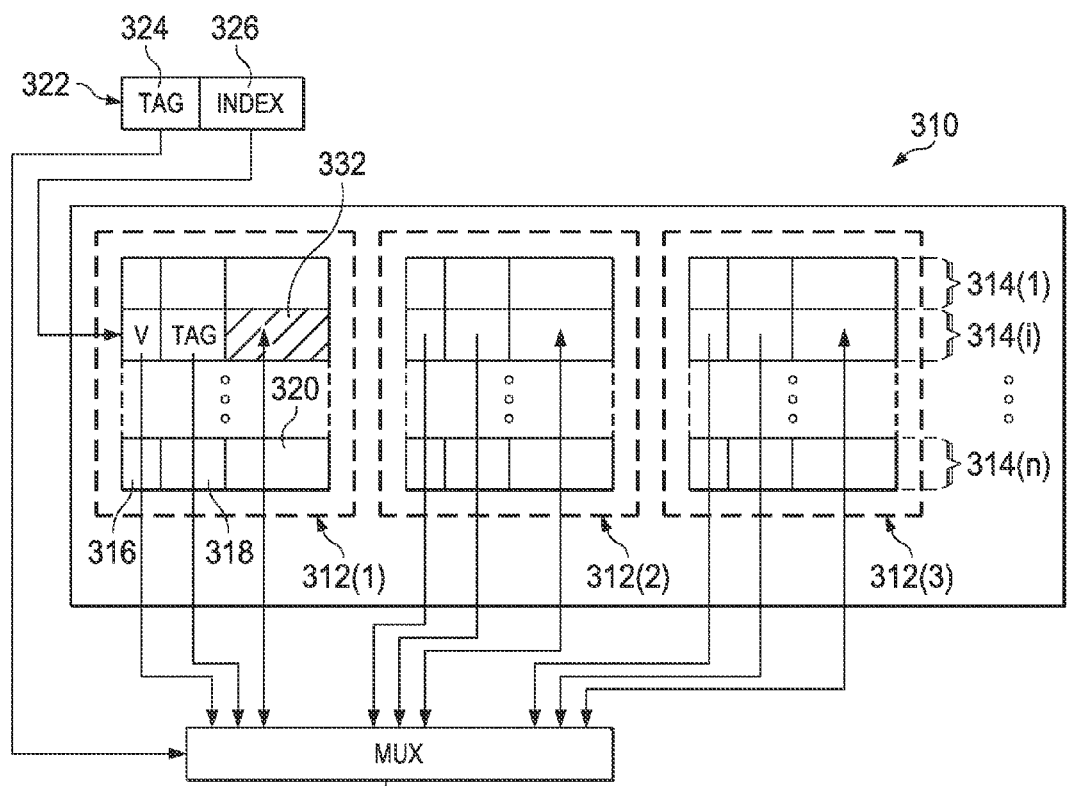
FIG. 7 is a block diagram of a cache memory in accordance with an embodiment.

Reference is now made to FIG. 7 which illustrates a block diagram of a cache memory 310 in accordance with an embodiment. The memory is formed of a plurality of cache ways 312 in particular comprising three cache ways 312(1), 312(2) and 312(3). Thus, FIG. 7 illustrates a cache memory of the three-way set associative type. Each cache way 312 is formed of a plurality of cache blocks 314. There may exist n cache blocks 314 in each cache way 312 (i.e., blocks 314(1)-314(n)). Each cache block 314 includes a validity flag 316, a tag field 318 and a data field 320.

The validity flag may comprise, for example, a single bit, the tag field may comprise, for example, two bits, and the data field may comprise, for example, a size of 4 bytes. The overall size of the cache memory 110 is calculated as the size of the cache block 314 times the number of cache blocks (n) times the number of cache ways 312. However, the effective size of the cache memory 310 is smaller and is equal to the size of a two-way set associative cache (like FIG. 1) because the third set in FIG. 7 is provided to support contention handling during instances of simultaneous read-write access as will be discussed in detail below.

The cache memory 310 is typically coupled to a processing system which utilizes an address 322 for memory access. The address 322 may be divided into a tag portion 324 and an index portion 326. The data within the tag portion 324 is referred to as the TAG. The tag fields 318 of the cache memory 310 form a TAG memory.

The data within the index portion 326 of the address 322 specifies a cache block 314 number. The cache memory responds to the index portion 326 by accessing the cache memory 310 at the corresponding cache block 314 across each of the cache ways 312. This is illustrated in an exemplary fashion in FIG. 7 with the selection, based on an index value of i=2 (data value "01"), of the cache block 314(i).

Responsive to the selection by means of the index portion 326 of the address 322 of a particular cache block 314(i), a multiplexing circuit 330 is provided with the validity flag 316 and tag field 318 data from the particular cache block 314(i) of each set (i.e., cache way 314). The multiplexing circuitry 330 functions to select, in response to the validity flag 316 and tag field 318 data, one of the data fields 320 from the cache block 314(i) for either read or write. This selection is made for read only if the validity flag 316 is set to valid ("V") and the tag field 318 data matches the TAG data from the tag portion 324 of the address 322. This is illustrated in an exemplary fashion in FIG. 7 with the selection, based on a matching TAG value and valid "V") bit, of the cross-hatched 332 data field 320 from cache block 314(i) in cache way 312(1).

Thus, in a read operation, the index portion 326 of the address 322 is used to identify a plurality of cache blocks 314, the tag portion 324 of the address 322 is used to narrow the cache blocks to only those cache blocks having a matching TAG, and the validity flag from the narrowed cache blocks is used to identify only one particular cache block 314. With this operation, the multiplexer circuit 330 is controlled to access a particular data field 320 of the cache memory 310 associated with that one particular cache block 314 (i.e., in one cache way 312) in order to read the data stored therein.

Likewise, in a write operation, the index portion 326 of the address 322 is used to identify a plurality of cache blocks 314, the tag portion 324 of the address 322 is used to narrow the cache blocks to only those cache blocks having a matching TAG, and the validity flag from the narrowed cache blocks is used to identify only one particular cache block 314. With this operation, the multiplexer circuit 330 is controlled to access a particular data field 320 of the cache memory 310 associated with that one particular cache block 314 (i.e., in one cache way 312) in order to write data therein.

Alternatively, for a write operation, the index portion 326 of the address 322 is used to identify a plurality of cache blocks 314, the tag portion 324 of the address 322 is used to narrow the cache blocks to only those cache blocks having a matching TAG. If the validity flag from a selected one of the narrowed cache blocks indicates invalid data status, the cache block is free for write. With this operation, the multiplexer circuit 330 is controlled to access a particular data field 320 of the cache memory 310 associated with that free cache block 314 (i.e., in one cache way 312) in order to write data therein.

It is further recognized that some processing systems coupled to cache memory 310 may support separate read and write addressing, for example, in connection with providing simultaneous read-write operations. In such an implementation, the address 322 will comprise a read address (RA) 322R and a write address (WA) 322W. Each of the read and write addresses will include a tag portion 324 and an index portion 326 as discussed above. Furthermore, the general operations described above for read and write will be performed in the same manner except that the read operation will consider only the data of the read address 322R and the write operation will consider only the data of the write address 322W in terms of identifying the match of the TAG with a valid ("V") validity flag at one particular cache block 314 and controlling the multiplexer circuit 330 selection of the data field 320 of the cache memory 310.

This raises a concern with respect to the possibility of a conflicting simultaneous access for read and write. The cache memory 310 with multiplexing circuit 330 is configured to handle the possible conflict and support simultaneous read-write in a single cycle.

Figure 8:
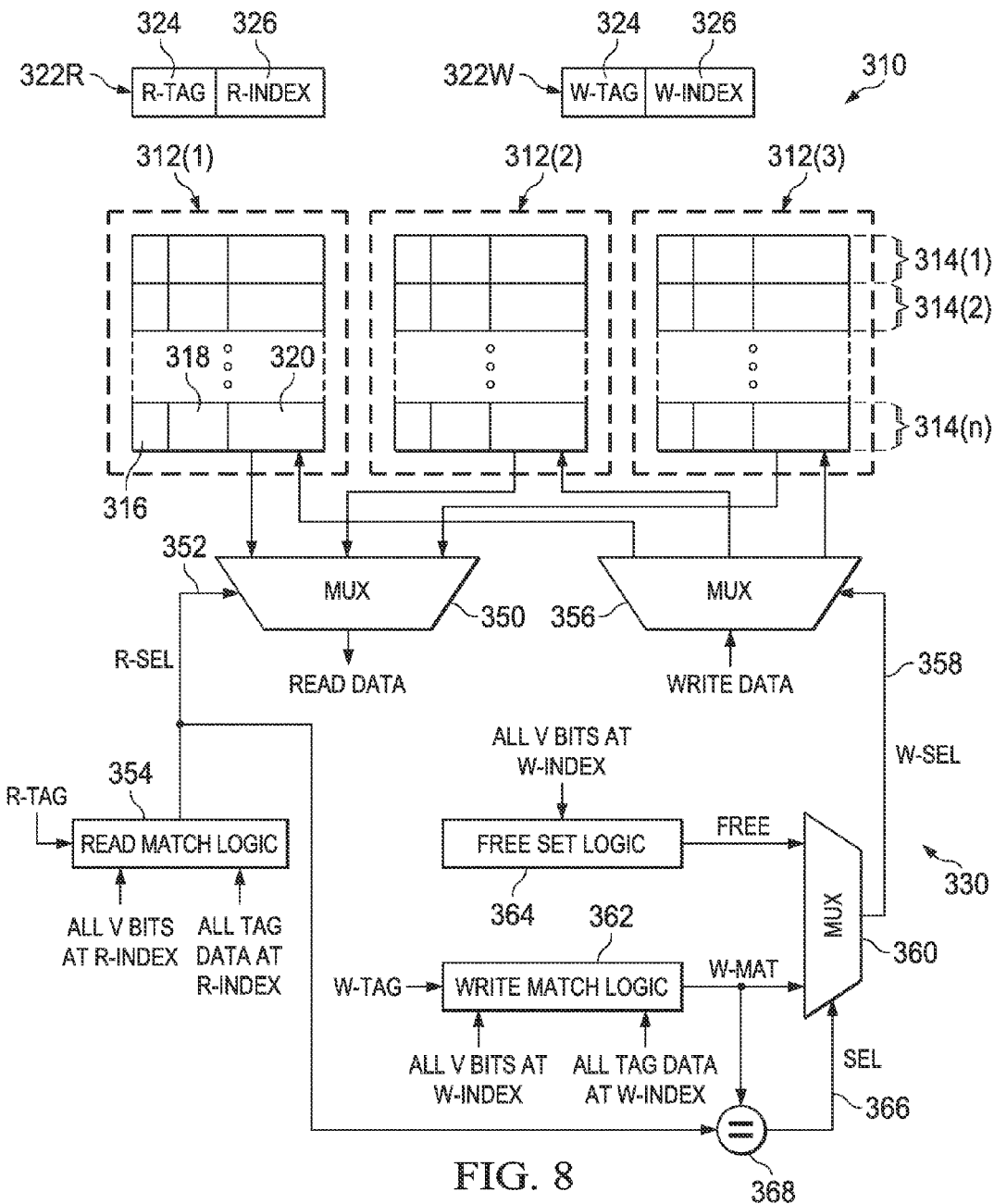
FIG. 8 is a more detailed block diagram of the cache memory of FIG. 8.

Reference is now made to FIG. 8 which illustrates a block diagram of the cache 310 of FIG. 7 with details of the multiplexing circuit 330.

The multiplexing circuit 330 includes a read multiplexer 350 including inputs from each of the cache ways 312 and an output configured to provide read data. More particularly, the inputs are coupled to the data fields 320, and the read data is data read from the data fields 320. The read multiplexer 350 includes a selection input 352 configured to receive a read select signal (R-SEL) output from a read match logic circuit 354.

Figure 9:
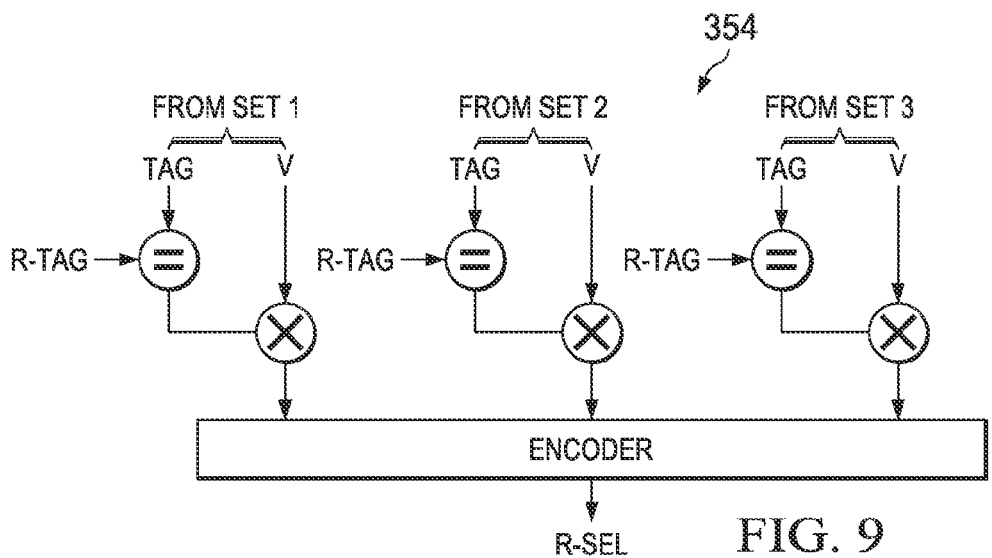
FIGS. 9-11 show exemplary block diagrams for logic circuitry.

As discussed above, in the read operation, the index portion 326 (R-INDEX) of the read address 322R is used to identify a plurality of cache blocks 314 and the tag portion 324 of the read address 322R supplies a read tag R-TAG value. The read match logic circuit 354 receives the R-TAG value along with the TAG data from the identified cache blocks 314 and the validity data ("V") from the identified cache blocks 314. The tag data is compared to identify matches with the R-TAG value and the validity data is used to identify whether the matched location contains valid data. An encoding function receives the results of the forgoing operations and generates the read select signal for output to the selection input 352 of read multiplexer 350. The details of one exemplary configuration of the read match logic circuit 354 are shown in FIG. 9.

The multiplexing circuit further includes a write multiplexer 356 including an input configured to receive write data and outputs coupled to each of the cache ways 312. More particularly, the outputs are coupled to the data fields 320, and the write data is data to be written to the data fields 320. The write multiplexer 356 includes a selection input 358 configured to receive a write selection signal W-SEL. The write selection signal W-SEL is output from a selection multiplexer 360 which includes inputs configured to receive a write match (W-MAT) value output from a write match logic circuit 362 and a free set (FREE) value output from a free set logic circuit 364.

Figure 10:
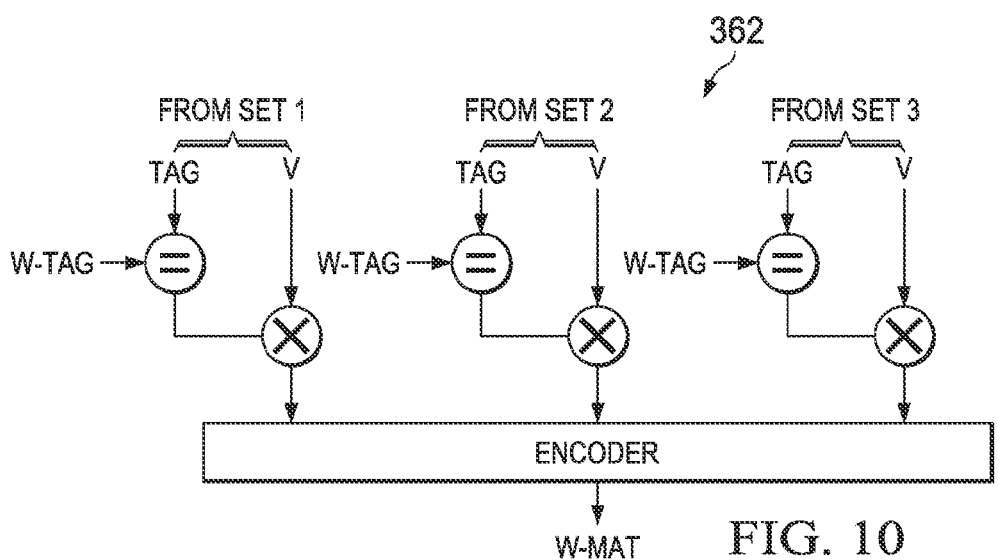

As discussed above, in the write operation, the index portion 326 (W-INDEX) of the write address 322W is used to identify a plurality of cache blocks 314 and the tag portion 324 of the write address 322W supplies a write tag W-TAG value. The write match logic circuit 362 receives the W-TAG value along with the TAG data from the identified cache blocks 314 and the validity data ("V") from the identified cache blocks 314. The tag data is compared to identify matches with the W-TAG value and the validity data is used to identify whether the matched location contains valid data. An encoding function receives the results of the forgoing operations and generates the write match signal for output to the selection multiplexer 360. The details of one exemplary configuration of the write match logic circuit 362 are shown in FIG. 10.

The selection multiplexer 360 includes a selection input 366 configured to receive a selection signal SEL. The selection signal SEL is output from a comparator circuit 368 that functions to compare the read select signal (R-SEL) (output from read match logic circuit 354) to the write match signal (W-MAT) (output from write match logic circuit 362). When the read select signal (R-SEL) value matches the write match signal (W-MAT) value, this is indicative of a conflicting read-write operation to a same set (cache way) and the comparator circuit 368 sets the logic value of the selection signal SEL to cause the selection multiplexer 360 to pass the free set (FREE) value as the write selection signal W-SEL. Conversely, when the read select signal (R-SEL) value does not match the write match signal (W-MAT) value, the comparator circuit 368 sets the logic value of the selection signal SEL to cause the selection multiplexer 360 to pass the write match signal (W-MAT) value as the write selection signal W-SEL.

Figure 11:
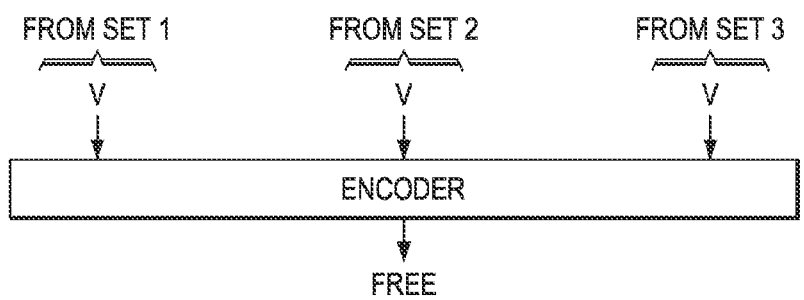

The free set logic circuit 364 receives the validity data ("V") from the identified cache blocks 314 identified by the index portion 326 (W-INDEX) of the write address 322W. This validity data indicates whether the data stored in the associated data field 320 for the cache block 314 is valid. If it is not valid, then this indicates that the data field 320 is available for a write operation. The free set logic circuit 364 uses an encoding function to generate the free set (FREE) signal whose value identifies the set having the available data field. The details of one exemplary configuration of the free set logic circuit 364 are shown in FIG. 11.

In non-conflicting simultaneous read-write conditions, the write operation is as discussed above with the location of the cache write being specified by the result of the write match operation because the selection multiplexer 360 will pass the write match signal (W-MAT) value as the write selection signal W-SEL. However, when a conflicting simultaneous read-write condition arises (i.e., when the read select signal (R-SEL) value matches the write match signal (W-MAT) value), the location of the cache write is instead specified by free set (FREE) signal because the selection multiplexer 360 will pass the free set (FREE) value as the write selection signal W-SEL.

Figure 12:
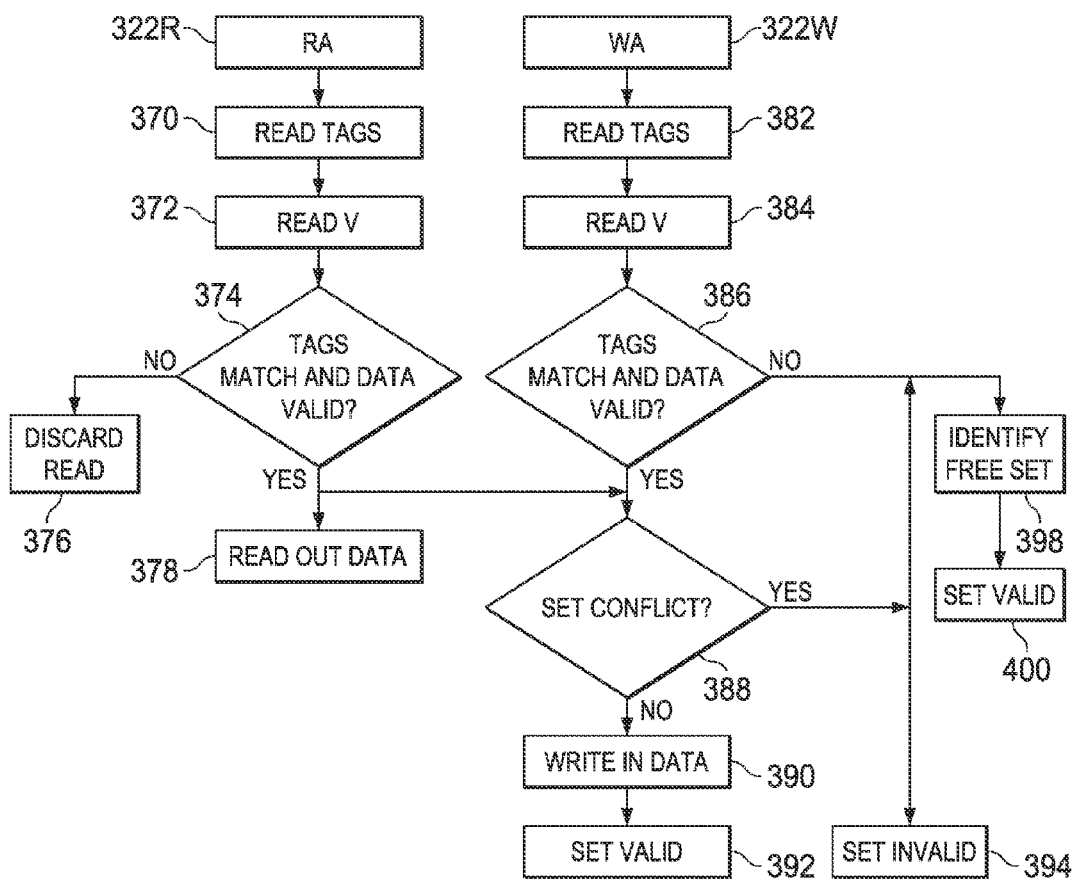
FIG. 12 illustrates a flow diagram for operation of the cache memory.

Reference is now made to FIG. 12 which illustrates a flow diagram for operation of the cache memory 310. The read address (RA) 322R is received and in step 370 the cache operates to read the TAG data from the tag fields 318 of the cache blocks 314 addressed by the read index (R-INDEX) value. The corresponding validity data (V) is also read at step 372. In step 374, a test is made to determine whether the read tags match the read tag (R-TAG) and for a such a match whether the data is valid. If not (NO in step 374), this indicates a cache miss and the read is discarded in step 376. If the test is satisfied (YES in step 374), this is indicative of a chance hit, and in step 378 the data contained data field 320 in the cache block 314 of the set (cache way 312) where test was satisfied is read.

The write address (WA) 322W is also received and in step 382 the cache operates to read the TAG data from the tag fields 318 of the cache blocks 314 addressed by the write index (W-INDEX) value. The corresponding validity data (V) is also read at step 384. In step 386, a test is made to determine whether the read tags match the write tag (W-TAG) and for such a match whether the data is valid. If the test is satisfied (YES in step 386), this is a cache hit and a next test is made in step 388 as to whether the read and write operations are being made to a same set (i.e., the same cache way 312). This is the operation performed by the comparator circuit 368 to generate the selection signal SEL indicative of a set conflict. The next test of step 388 accordingly receives the set identification for the read operation to be performed in step 378. If the next test is not satisfied (NO in step 388), there is no conflict with respect to the simultaneous read-write operation, and in step 390 the write operation is completed by writing the data to the data field 320 in the cache block 314 of the set (cache way 312) where the test was satisfied. The validity flag 316 for the data field 320 is also set as valid in step 392. If the next test is satisfied (YES in step 388), there is a conflict with respect to the simultaneous read-write operation, and the validity flag 316 for the data field 320 is set as invalid in step 394. The write operation must be performed, in this instance of a set conflict, to a different set.

If the test is not satisfied (NO in step 386) or the next test is satisfied (YES in step 388), the cache process identifies in step 396 a different set (cache way 312) having a free data field 320 at the cache block 314 addressed by the write index (W-INDEX) value. In step 390 the write operation is completed by writing the data to the data field 320 in the cache block 314 of the identified free set (cache way 312). The validity flag 316 for the data field 320 is also set as valid in step 400.

The operation described above, especially in the context of a conflicting simultaneous read-write condition, may be better understood by reference to a specific example. It will be understood that the illustrated specifics are exemplary in nature only and that some simplification of cache size and configuration is presented in order to facilitate understanding of the operation.

Figure 13A:
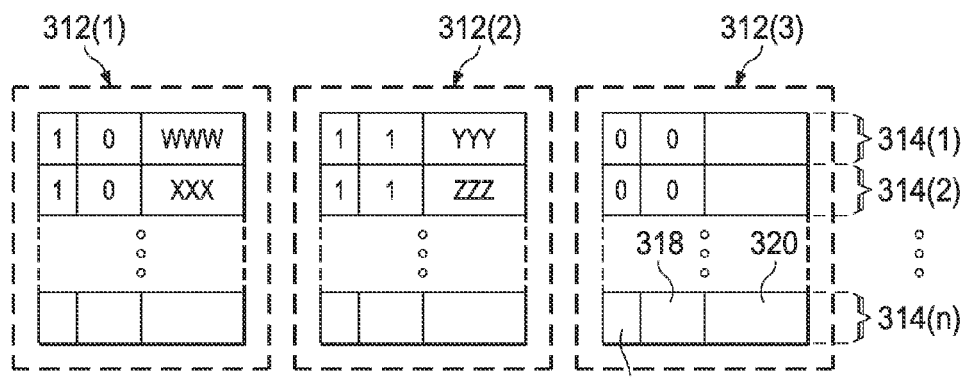
FIGS. 13A to 13E illustrate various read and/or write operations for the cache memory in accordance with the flow diagram of FIG. 12.

FIG. 13A shows an initial condition of the cache 110 prior to a read and/or write operation. The data value "0" in the validity flag 316 indicates the data stored in the data field 320 is invalid. Conversely, the data value "1" in the validity flag 316 indicates the data stored in the data field 320 is valid. The values, "0" or "1" in the tag field 318 are the TAG values.

Figure 13B:
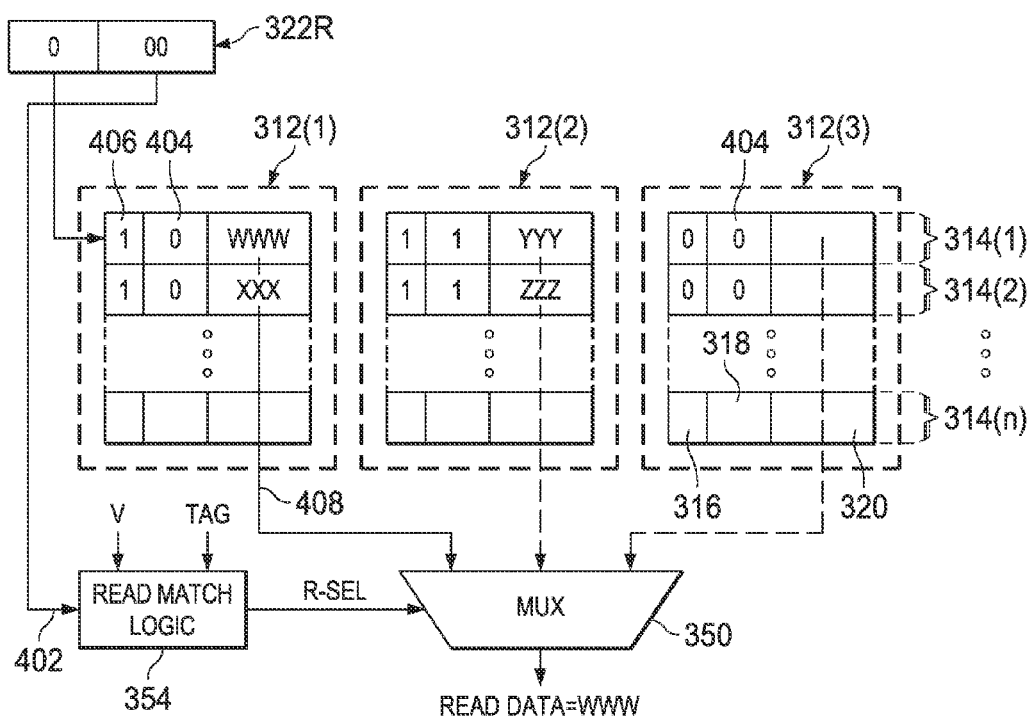

FIG. 13B illustrates a read only operation. The read address (RA) 322R is received. The tag portion 324 has a data value "0" and the index portion 326 of the read address 322R (having a value of 1, data value "00") indicates that the first cache block 314(1) has been selected (reference 402). The read match logic 354 receives the tag portion 324 and identifies which of the sets (cache ways 314) include matching tag values. In this example, for cache blocks 314(1), the first and third cache ways 314 have matching tag values (reference 404). However, only the first cache way 314 further has a valid set validity flag 316 (reference 406). This is the location of the cache hit. The encoding function of the read match logic 354 accordingly generates a read selection signal (R-SEL) having a value of 1 (data value "00") which causes the read multiplexer 350 to select the first set (first cache way 312(1)) for the read operation (reference 408, reading out the data value of WWW).

Figure 13C:
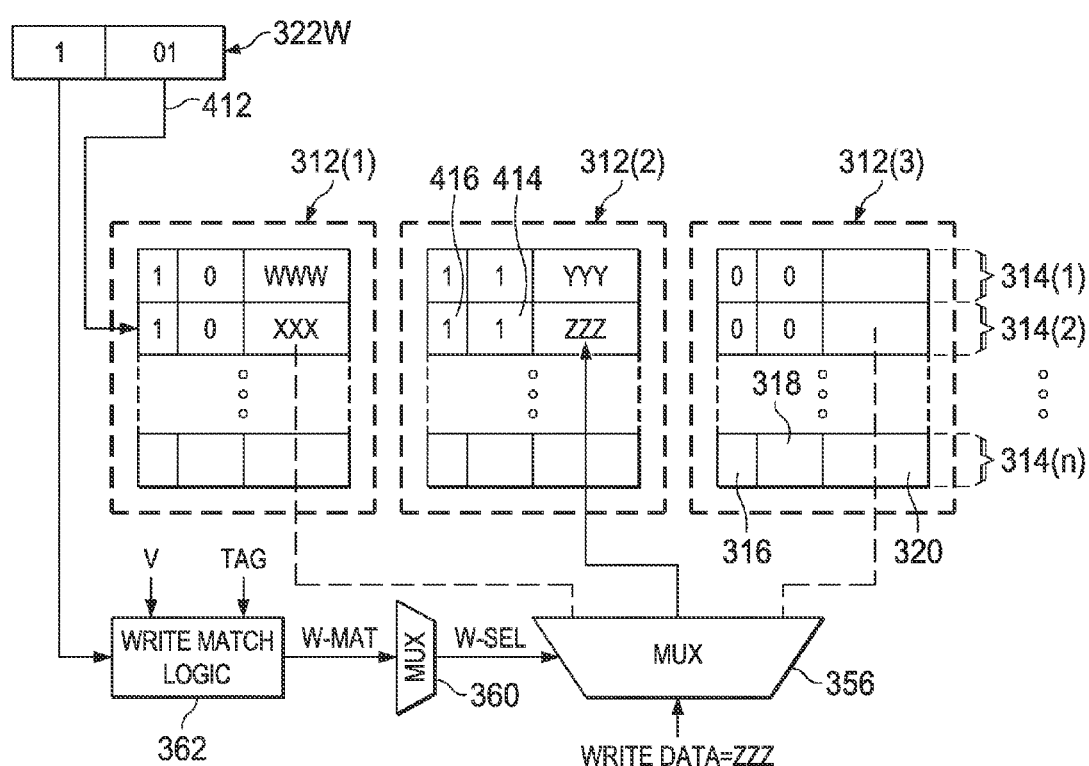

FIG. 13C illustrates a write only operation. The write address (WA) 322W is received. The tag portion 324 has a data value "1" and the index portion 326 of the write address 322W (having a value of 2, data value "01") indicates that the second cache block 314(2) has been selected (reference 412). The write match logic 362 receives the tag portion 324 and identifies which of the sets (cache ways 314) include matching tag values. In this example, for cache blocks 314(2), only the second cache way 314 has a matching tag value (reference 444). Additionally, the second cache way 314 also has a valid set validity flag 316 (reference 416) indicating a cache hit, although having such a validity flag state is not mandatory for completion of the write. The encoding function of the write match logic 362 accordingly generates a write match signal (W-MAT) having a value of 2 (data value "01") which is passed through selection multiplexer as the write selection signal (W-SAEL) which causes the write multiplexer 356 to select the second set (second cache way 312(2)) for the write operation (reference 418, writing in the data value of ZZZ).

The descriptions and illustrations of FIGS. 13B and 13C further illustrate the operations with respect to a simultaneous read-write operation with no conflict. There is no conflict in this case because the read is being made from the first set (first cache way 312(1)) and the write is being made to the second set (second cache way 312(2)).

Figure 13D:
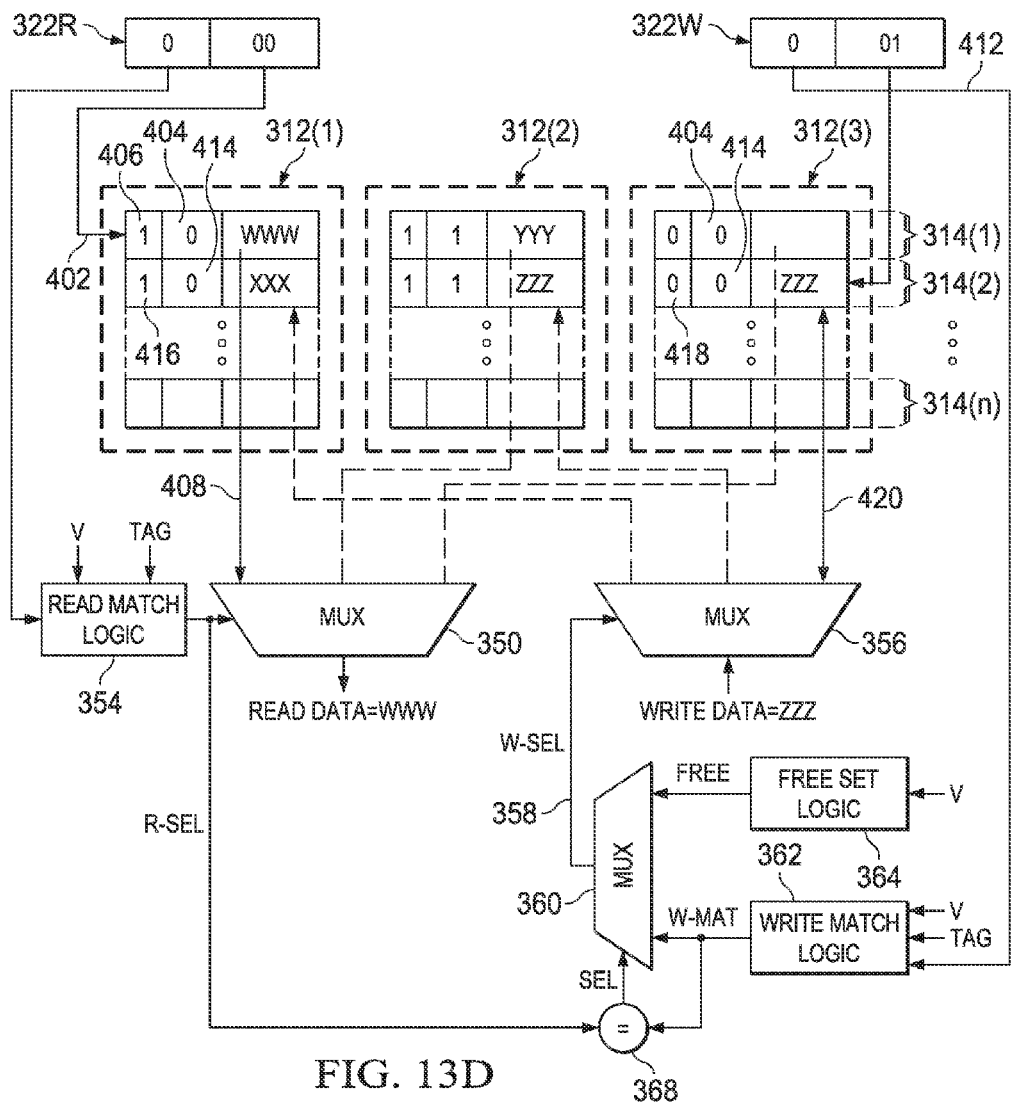

FIG. 13D illustrates a simultaneous read-write operation with conflict. The read address (RA) 322R and write address (WA) 322R are received.

For the read operation, the read address (RA) 322R has a tag portion 324 with a data value "0" and an index portion 326 (having a value of 1, data value "00") indicating that the first cache block 314(1) has been selected (reference 402). The read match logic 354 receives the tag portion 324 and identifies which of the sets (cache ways 314) include matching tag values. In this example, for cache blocks 314(1), the first and third cache ways 314 have matching tag values (reference 404). However, only the first cache way 314 has a valid set validity flag 316 (reference 406). The encoding function of the read match logic 354 accordingly generates a read selection signal (R-SEL) having a value of 1 (data value "00") which causes the read multiplexer 350 to select the first set (first cache way 312(1)) for the read operation (reference 408, reading out the data value of WWW).

For the write operation, the write address (RA) 322W has a tag portion 324 with a data value "0" and an index portion 326 (having a value of 2, data value "01") indicating that the second cache block 314(2) has been selected (reference 412). The write match logic 362 receives the tag portion 324 and identifies which of the sets (cache ways 314) include matching tag values. In this example, for cache blocks 314(2), the first and third cache ways 314 have matching tag values (reference 414). However, only the first cache way 314 has a valid set validity flag 316 (reference 416). The encoding function of the write match logic 362 accordingly generates a write match (W-MAT) signal having a value of 1 (data value "00") indicating a write to be made to the first set (first cache way 312(1)). The comparator circuit 368 then determines that the values of the read selection signal (R-SEL) (value of 1, data value "00") and write match (W-MAT) signal (value of 1, data value "00") are in a matching condition. This match indicates that that there is a set (cache way 312) conflict between the simultaneous read-write operation. The select signal (SEL) output from the comparator circuit 368 accordingly has a logic value which causes the selection multiplexer 360 to block the write match (W-MAT) signal and instead select the free set (FREE) signal.

The free set logic 364 receives all the validity flag bits from the cache sets (cache ways 312) at the write index (W-INDEX) and identifies a free set by finding a cache way (other than the first cache way 312(1) where the write was to be performed, but which is conflicted) with a free data field 320. This is indicated, for example, by the validity flag 316 having an invalid bit state ("0"). In this case, as shown at reference 418, with the data field 320 in the third set (third cache way 312(3)). The encoding function of the free set logic 364 accordingly generates a free set (FREE) signal having a value of 3 (data value "10") which is passed by the selection multiplexer 360 as the write selection signal (W-SEL) which causes the write multiplexer 356 to select the third set (third cache way 312(3)) for the write operation (reference 420, writing in the data value of ZZZ).

Figure 13E:
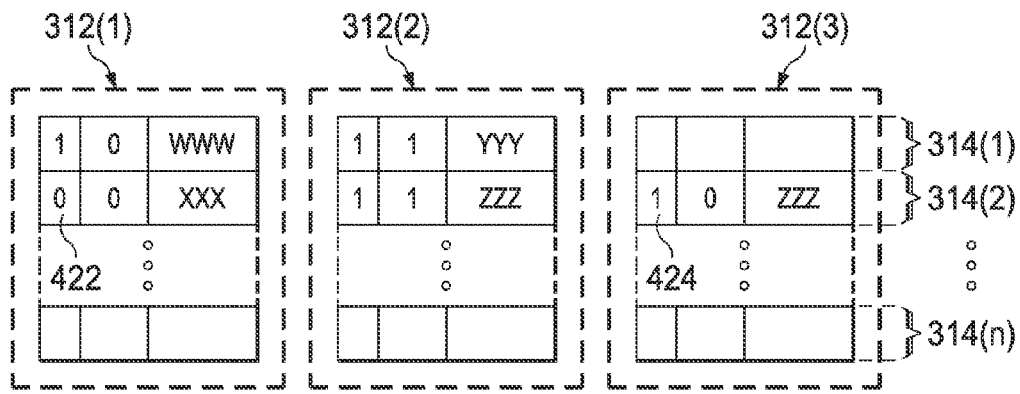

FIG. 13E shows a final condition of the cache 310 after the simultaneous read-write operation with conflict is completed. As noted in step 394 of FIG. 12, the validity flag 316 at the originally identified write location must be set to invalid. Thus, reference 422 indicates that the validity flag 316 in the first set (first cache way 312(1)) at the selected second cache block 314(2) indicated by the write index W-INDEX is set to invalid (logic "0"). Furthermore, as noted in step 400 of FIG. 12, the validity flag 316 at the newly identified write location must be set to valid. Thus, reference 424 indicates that the validity flag 316 in the third set (third cache way 312(3)) at the selected second cache block 314(2) indicated by the write index W-INDEX is set to valid (logic "1").

Figure 14:
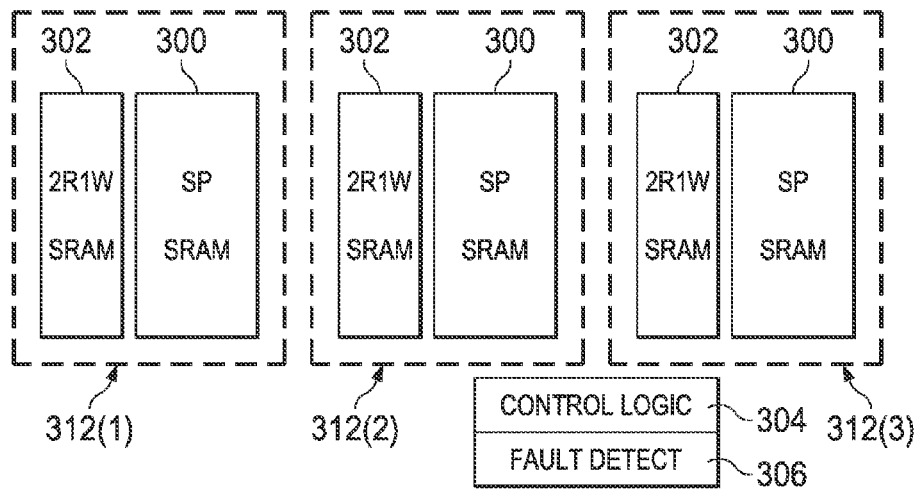
FIG. 14 is an architecture and block diagram for the cache of FIG. 7.

Reference is now made to FIG. 14 which illustrates an architecture and block diagram for the cache of FIG. 7. Each cache way 312 is formed of a single port SRAM 300 (used for the data fields 320) and a simultaneous 2R1W port (two read port, one write port) SRAM 302 (used for the validity flags 316 and tag fields 118). A 2R1W port memory is needed because the cache must support a read from the validity flag 316 and tag fields 318 during read, a read from the validity flag 316 and tag fields 318 during write, and a write to the validity flag 316 and tag fields 118 during update in instances of read-write conflict. The cache further includes a control logic circuit 304 implementing the multiplexing circuitry 330 and functions associated with cache operation as described herein.

The cache memory 310 of FIG. 7 has the following initialization requirements: at power-up the portion of the cache providing the tag memory must be initialized to a predefined state. If the tag memory is built from RAM, then an M cycle (where M is the depth of the memory) process is performed to initialize the complete tag memory. Unlike the FIG. 2 cache implementation which requires full tag field initialization, the cache of FIG. 7 requires that only one validity flag per word be initialized to a predetermined value. For example, the initialization may set all validity flags to the invalid logic state. The tag memory can be implemented using flip-flop technology, and this permits initialization to occur through set and reset operations. The use of such flip-flops for the tag memory permits a implementation of the tag memory with a smaller area cost and the initialization circuitry is less complex.

Because the cache of FIG. 7 manages the mapping of address space across the three-way associative cache configuration using the tag memory, the system is susceptible to corruption (for example, due to soft error or intentional attack) of the tag data bits. Such corruption could lead to memory corruption. Detection of such corruption is accordingly of interest.

The cache of FIG. 7, through use of the control logic 304 of FIG. 14, and in particular a fault detection circuit 306, is configured to implement a corruption detection mechanism providing for three separate tests. First test: out of three words selected across the three-way associative cache (three cache ways), at least one of the words must be provided with a validity flag indicating that the data is invalid. Thus, the control logic 304 can scan across the cache blocks to ensure that for a given index value at least one of the validity flags shows an invalid state. Second test: a parity bit can be added for the invalidity flag data. This parity bit, when evaluated by the control logic 304, can detect the presence of single bit corruption in the validity flags (to be handled, for example, by invalidating the entire row of the cache). Third test: the parity bit can be extended to cover the tag data as well. This parity bit, when evaluated by the control logic 304, can detect the presence of single bit corruption in the combined validity flags and tag data (to be handled, for example, by invalidating the entire row of the cache).

Figure 15:
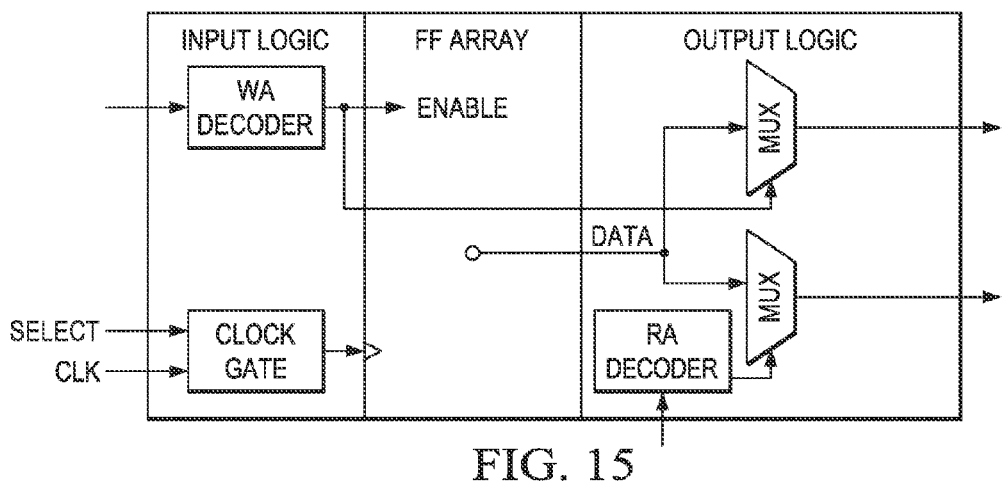
FIGS. 15 and 16 illustrate an exemplary configuration for the tag memory.

As discussed above, the cache memories of FIGS. 2 and 7 utilize a tag memory of the 2R1W port type which utilizes flip-flops (FF) as the storage cells. An example of such a memory is shown in FIGS. 15 and 16.

It is noted that provision of the three-way set associative type of cache memory with simultaneous read-write operation as shown in FIG. 3 may not be appropriate in all implementations. Thus, there would be an advantage if the memory space of the cache implementation shown in FIG. 3 could be reconfigured. For example, there would be an advantage if the memory space for the cache memory of FIG. 3 could be reconfigurable to additionally support a direct mapped (i.e., one-way set associative) cache memory architecture.

Figure 16:
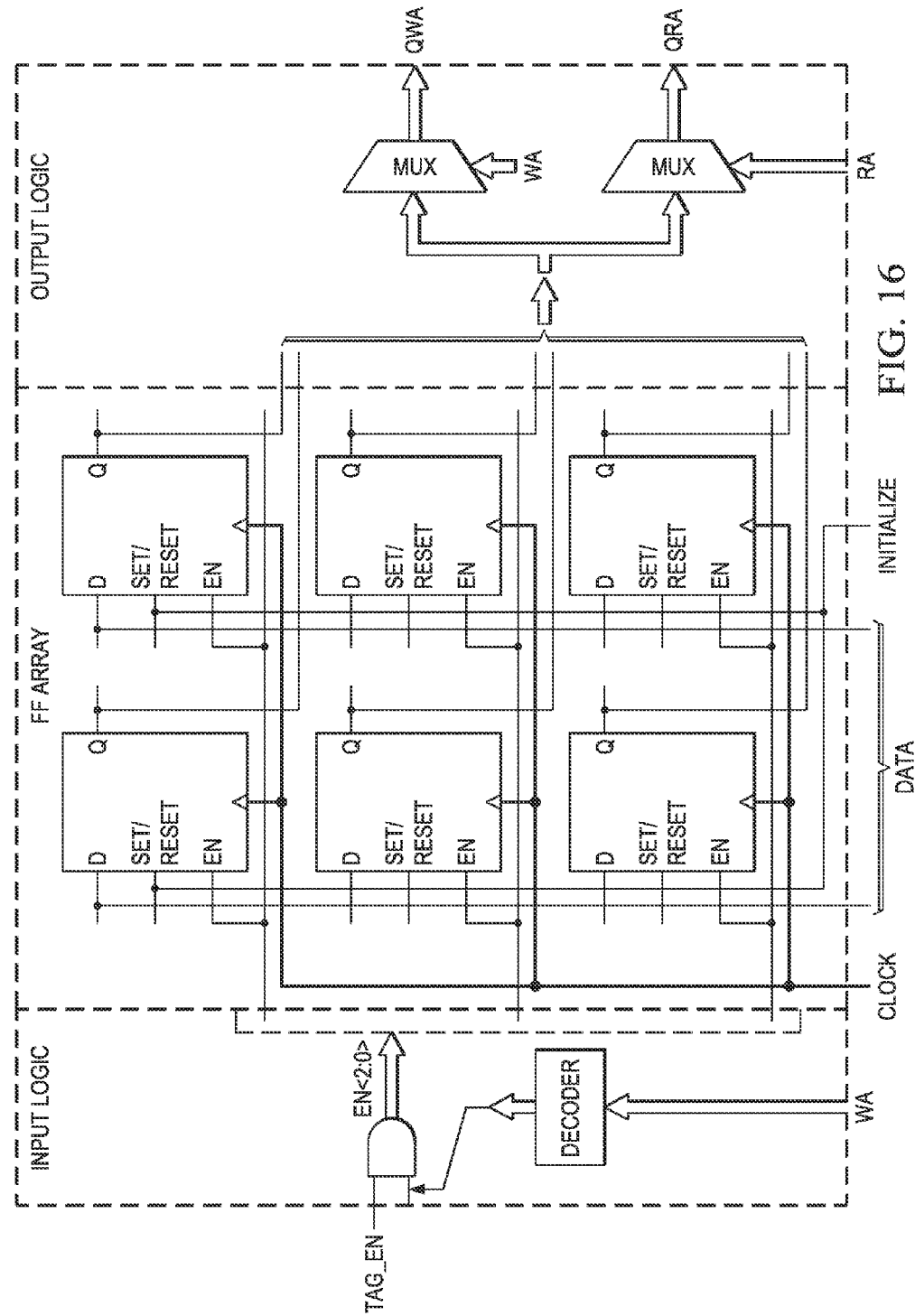

Reference is now made to FIG. 16 which illustrates a more detailed block diagram of the cache memory of FIG. 3 including circuitry for providing a configurable memory space. In this context, like reference numbers in FIGS. 3 and 16 refer to like or similar parts and discussion of same is omitted (see, discussion above for details). The following description focuses on differences between the cache of FIG. 3 and the cache of FIG. 16 which support memory reconfiguration.

The multiplexing circuitry 130 of the cache memory in FIG. 16 includes two additional selection multiplexers. A first cache configuration selection multiplexer 400 includes inputs configured to receive the read encoded tag (R-TAG$_E$) value and the tag portion 124 (incoming tag (TAG$_I$)). The output of the multiplexer 400 provides the control signal applied to the selection input 152 of the read multiplexer 150. The multiplexer 400 includes a selection input configured to receive a mode signal (MODE) 402. A second cache configuration selection multiplexer 404 includes inputs configured to receive the output of the selection multiplexer 160 (i.e., the write encoded tag (W-TAG$_E$) value or the third set encoded tag (3-TAG$_E$) value) and the tag portion 124 (incoming tag (TAG$_I$)). The output of the multiplexer 402 provides the first selection signal 1-SEL applied to the selection input 156 of the write multiplexer 154. The multiplexers 400 and 402 each include a selection input configured to receive a mode signal (MODE) 404. The mode signal may be applied to an external pin of the cache or alternatively generated by configuration circuitry located on chip for the cache.

When the mode signal 402 has a first logic state, the multiplexer 400 operates to pass the received read encoded tag (R-TAG$_E$) value as the control signal for the read multiplexer 400 and the multiplexer 402 operates to pass one of the write encoded tag (W-TAG$_E$) value or the third set encoded tag (3-TAG$_E$) value (depending on the value of the second selection signal 2-SEL) as the control signal for the write multiplexer 154. Thus, in this condition, the cache of FIG. 16 operates in the manner described above with respect to FIG. 3 and implements a three-way set associative cache supporting simultaneous read-write operations.

However, when the mode signal 402 instead has a second logic state, the multiplexer 400 operates to pass the incoming tag (TAG$_I$) value as the control signal for the read multiplexer 400 and the multiplexer 402 operates to pass the incoming tag (TAG$_I$) value as the control signal for the write multiplexer 154. The effect of this is to by-pass the tag memory and reconfigure the cache memory as a direct mapped (i.e., one-way set associative) cache. The total memory space of the three single port SRAMs 300 (FIG. 6) is accordingly made available.

It is noted that provision of the three-way set associative type of cache memory with simultaneous read-write operation as shown in FIG. 3 may not be appropriate in all implementations. Thus, there would be an advantage if the memory space of the cache implementation shown in FIG. 2 could be reconfigured. For example, there would be an advantage if the memory space for the cache memory of FIG. 3 could be reconfigurable to additionally support a conventional three-way set associative cache memory architecture.

Figure 17:
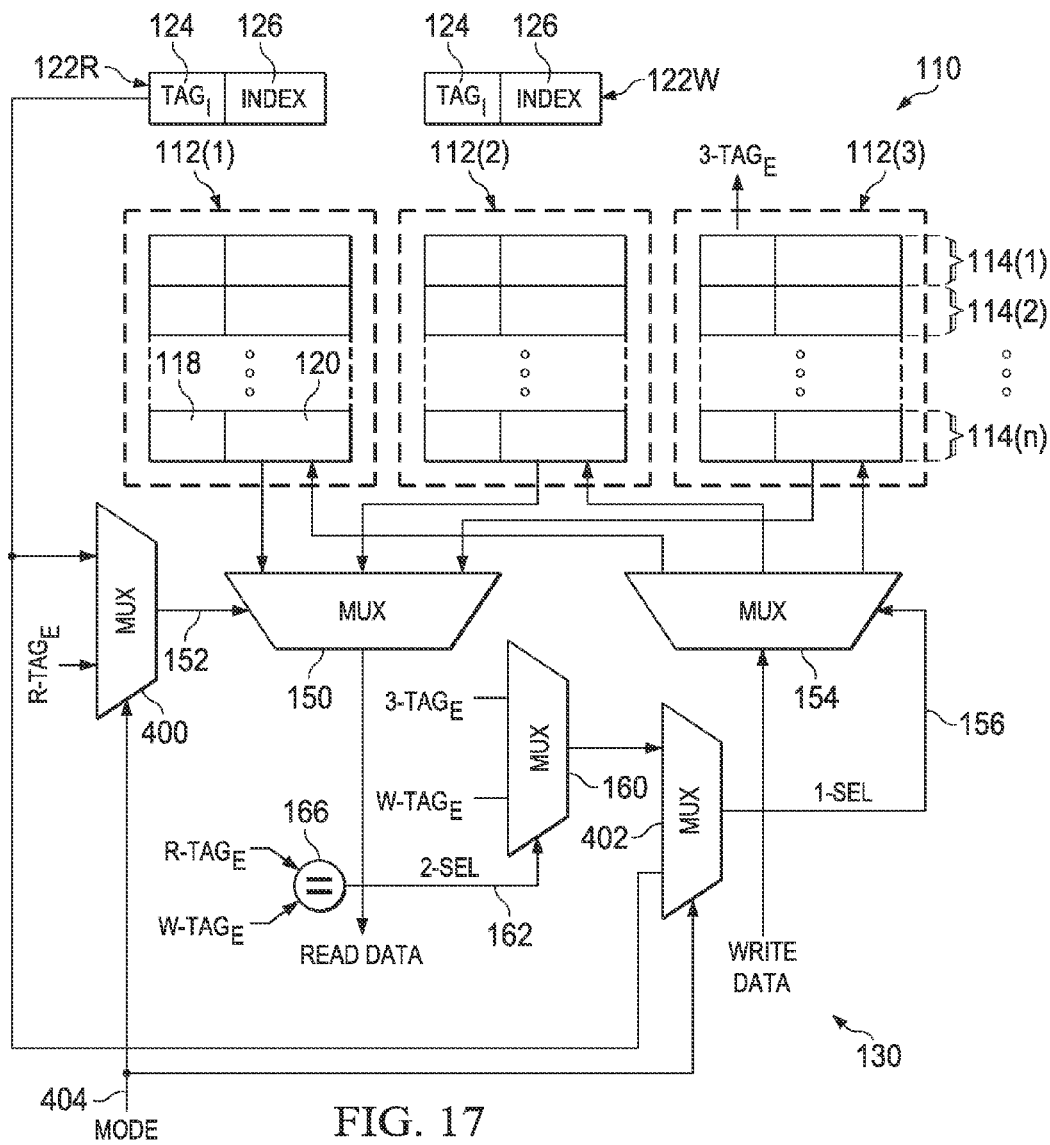
FIG. 17 is a more detailed block diagram of the cache memory of FIG. 3 with circuitry for providing a configurable memory space.
Figure 18:
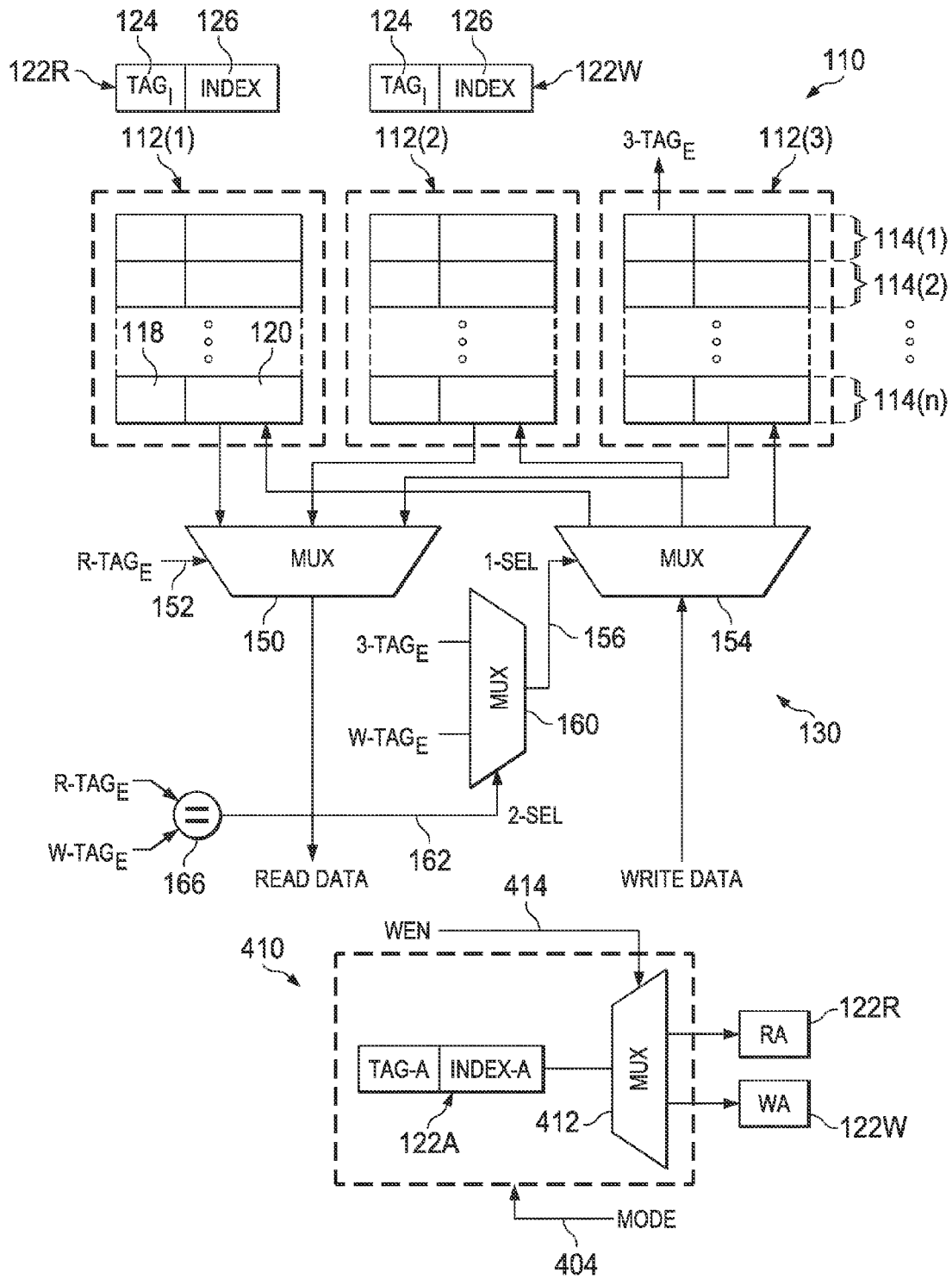
FIG. 18 is a more detailed block diagram of the cache memory of FIG. 3 with circuitry for providing a configurable memory space.

Reference is now made to FIG. 17 which illustrates a more detailed block diagram of the cache memory of FIG. 3 including circuitry for providing a configurable memory space. In this context, like reference numbers in FIGS. 3 and 16 refer to like or similar parts and discussion of same is omitted (see, discussion above for details). The following description focuses on differences between the cache of FIG. 3 and the cache of FIG. 16 which support memory reconfiguration.

In the implementation of FIG. 17, a top level demultiplexing circuit 410 provides the read address 122R and the write address 122W. The circuit 410 includes an address selection multiplexer 412 having an input configured to receive an address 122A and outputs which supply the read address (RA) and write address (WA). The multiplexer 412 includes a selection input configured to receive a write enable signal (WEN) 414. The mode signal may be applied to an external pin of the cache or alternatively generated by configuration circuitry located on chip for the cache.

When the write enable signal 414 has a first logic state, the multiplexer 402 operates to pass the received address 122A as the read address (RA) 122R. Conversely, when the write enable signal 414 has a second logic state, the multiplexer 402 operates to pass the received address 122A as the write address (WA) 122W. The effect of this is to keep the encoded tag ($TAG_E$) value equal to the incoming tag ($TAG_I$) value. As a result, the cache memory of FIG. 17 will operate as a conventional three-way set associative cache.

Operation of the top level demultiplexing circuit 410 is subject to the logic state of the mode signal (MODE) 404. The mode signal may be applied to an external pin of the cache or alternatively generated by configuration circuitry located on chip for the cache. When the mode signal 402 has a first logic state, the top level demultiplexing circuit 410 is disabled and the read and write addresses are separately applied. Thus, in this condition, the cache of FIG. 17 operates in the manner described above with respect to FIG. 3 and implements a three-way set associative cache supporting simultaneous read-write operations. However, when the mode signal 402 has a second logic state, the top level demultiplexing circuit 410 is enabled to provide the read and write addresses based on the received address 122A subject to the state of the write enable signal. Thus, in this condition, the cache of FIG. 17 operates as a conventional three-way set associative cache.

Although preferred embodiments of the method and apparatus of the present invention have been illustrated in the accompanying Drawings and described in the foregoing Detailed Description, it will be understood that the invention is not limited to the embodiments disclosed, but is capable of numerous rearrangements, modifications and substitutions without departing from the spirit of the invention as set forth and defined by the following claims.

What is claimed is:

1. A cache memory, comprising:
   an N-way set-associative memory structure including N cache ways, each cache way of the N-way set associative memory structure comprising a plurality of tag memory fields and a corresponding plurality of data fields;
   an additional cache way comprising a plurality of tag memory fields and a corresponding plurality of data fields;
   a control circuit including multiplexing circuitry coupled to the data fields, said control circuit configured to operate, in an instance of a simultaneous read-write operation defined by a read memory address including a read tag portion and a read index portion, wherein the read tag portion has a value that solely identifies one of the N cache ways of the N-way set associative memory structure, and a write memory address including a write tag portion and a write index portion, wherein the write tag portion has a value that solely identifies one of the N cache ways of the N-way set associative memory, to:
   determine a cache hit and control the multiplexing circuitry to effectuate a read from one of the additional cache way and the N cache ways of the N-way set associative memory structure as indicated by the read tag portion and the read index portion of the read memory address;
   determine whether a write as indicated by the write tag portion and the write index portion of the write memory address would be made in a same one of the additional cache way and the N cache ways of the N-way set associative memory structure as the read so as to be in conflict; and
   with such conflict, control the multiplexing circuitry to effectuate the write, simultaneously with the read, to one of the additional cache way and N cache ways of the N-way set associative memory structure that is identified by a substitute encoded tag value contained in the corresponding tag memory field of the additional cache way.

2. The cache of claim 1, wherein N is greater than or equal to two.

3. The cache of claim 1, wherein the plurality of tag memory fields in each cache way store encoded tag values, and wherein the control circuit uses the tag portion and index portion to select a particular tag memory field in a particular cache way to retrieve the encoded tag value.

4. The cache of claim 3, for the read, wherein the encoded tag value identifies the one of the additional cache way and the N cache ways of the N-way set associative memory structure from which the multiplexing circuitry effectuates the read.

5. The cache of claim 3, for the write, wherein the encoded tag value identifies the same one of the additional cache way and the N cache ways of the N-way set associative memory structure to which the multiplexing circuitry would effectuate the write.

6. The cache of claim 5, for the write when there is conflict, wherein the substitute encoded tag value identifies the one of the additional cache way and the N cache ways of the N-way set associative memory structure to which the multiplexing circuitry effectuates the write simultaneously with the read.

7. The cache of claim 3, wherein the control circuit comprises a comparator configured to compare a read encoded tag value obtained from the read tag portion and read index portion to a write encoded tag value obtained from the write tag portion and write index portion and generate a signal indicative of said conflict when the read and write encoded tag values match.

8. The cache of claim 7, wherein the control circuit further comprises a selection multiplexor configured to select, in response to said signal, between the write encoded tag value and the substitute encoded tag value.

9. The cache of claim 8, wherein the substitute encoded tag value identifies the one of the additional cache way and N cache ways of the N-way set associative memory structure to which the multiplexing circuitry effectuates the write simultaneously with the read.

10. The cache of claim 1, wherein each of the additional cache way and N cache ways of the N-way set associative memory structure further comprises a corresponding plurality of validity fields storing a validity flag.

11. The cache of claim 10, wherein the control circuit includes read match logic configured to identify the one of the additional cache way and N cache ways of the N-way set associative memory structure from which the multiplexing circuitry effectuates the read whose validity flag at the validity field identified by the read index portion is valid and is selected by the read encoded tag value.

12. The cache of claim 10, wherein the control circuit includes write match logic configured to identify the one of the additional cache way and N cache ways of the N-way set associative memory structure to which the multiplexing circuitry effectuates the write as selected by the write encoded write tag value if no conflict or the substitute encoded tag value if there is conflict.

13. The cache of claim 12, wherein the control circuit comprises a comparator configured to compare the read encoded tag value for the read to the write encoded tag value for the write and generate a signal indicative of the conflict when the read and write encoded tag values match.

14. The cache of claim 13, wherein the control circuit further comprises a selection multiplexor configured to select, in response to said signal, between the additional cache way and N cache ways of the N-way set associative memory structure for the write.

15. The cache of claim 14, wherein the control circuit further comprises free set logic configured to identify the one of the additional cache way and N cache ways of the N-way set associative memory structure by finding the cache way having a free data field identified by the write index portion.

16. The cache of claim 15, wherein the free set logic checks for validity flags identified by the write index portion whose value indicates that the corresponding data field contains invalid data.

17. The cache of claim 10, further comprising fault detection circuitry coupled to test validity flags identified by the write index portion whose value indicates that the corresponding data field to identify errors with respect to stored tag data.

18. The cache of claim 17, further comprising a parity bit for the validity flags identified by the write index portion whose value indicates the corresponding data field, said fault detection circuitry operable to test the parity bit for error identification.

19. The cache of claim 18, wherein the parity bit is calculated for a combination of the validity flags and tag data identified by the write index portion whose value indicates the corresponding data field.

20. The cache of claim 1, wherein the plurality of tag memory fields are implemented by an array of flip-flop circuits which enable simultaneous two read port, one write port operation.

21. The cache of claim 1, wherein said array of flip-flops are initialized to store initial data values.

22. The cache of claim 1, further comprising fault detection circuitry coupled to the plurality of tag memory fields and configured to detect errors with respect to stored tag data.

23. The cache of claim 1, further comprising memory configuration selection circuitry configured responsive to a mode selection signal to switch the N-way set-associative memory structure to a one-way set-associative memory structure.

24. The cache of claim 1, further comprising memory configuration selection circuitry configured responsive to a mode selection signal to disable support of the simultaneous read-write operation for the N-way set-associative memory structure.

25. A cache memory management method, wherein the cache memory is an N-way set-associative memory structure including N cache ways, each cache way of the N-way set-associative memory structure comprising a plurality of tag memory fields and a corresponding plurality of data fields and an additional cache way comprising a plurality of tag memory fields and a corresponding plurality of data fields, the method comprising, in an instance of a simultaneous read-write operation defined by a read memory address including a read tag portion and a read index portion, wherein the read tag portion has a value that solely identifies one of the N cache ways of the N-way set associative memory structure, and a write memory address including a write tag portion and a write index portion, wherein the write tag portion has a value that solely identifies one of the N cache ways of the N-way set associative memory:
  determining a cache hit and effectuating a read from one of the additional cache way and the N cache ways of the N-way set associative of the memory structure as indicated by the read tag portion and the read index portion of the read memory address;
  determining whether a write as indicated by the write tag portion and the write index portion of the write memory address would be made in a same one of the additional cache way and the N cache ways of the N-way set associative memory structure as the read so as to be in conflict; and
  with such conflict, effectuating the write, simultaneously with the read to said one of the cache ways, to one of the additional cache way and N cache ways of the N-way set associative memory structure that is identified by a substitute encoded tag value contained in the corresponding tag memory field of the additional cache way.

26. The method of claim 25, wherein N is greater than or equal to two.

27. The method of claim 25, wherein the plurality of tag memory fields in each cache way store encoded tag values, further comprising using the tag portion and index portion to select a particular tag memory field in a particular cache way to retrieve the encoded tag value.

28. The method of claim 27, for the read, wherein the encoded tag value identifies the one of the additional cache way and the N cache ways of the N-way set associative memory structure from which the read is effectuated.

29. The method of claim 27, for the write, wherein the encoded tag value identifies the same one of the additional cache way and the N cache ways of the N-way set associative memory structure to which the write is effectuated.

30. The method of claim 29, for the write when there is conflict, wherein the substitute encoded tag value identifies the one of the additional cache way and the N cache ways of the N-way set associative memory structure to which read and write are simultaneously effectuated.

31. The method of claim 27, further comprising:
  comparing a read encoded tag value obtained from the read tag portion and read index portion to a write encoded tag value obtained from the write tag portion and write index portion; and
  generating a signal indicative of said conflict when the read and write encoded tag values match.

32. The method of claim 31, further comprising selecting, in response to said signal, between the write encoded tag value and the substitute encoded tag value.

33. The method of claim 32, wherein the substitute encoded tag value identifies the one of the additional cache way and N cache ways of the N-way set associative memory structure to which the write is effectuated simultaneously with the read.

34. The method of claim 25, wherein each of the additional cache way and N cache ways of the N-way set associative memory structure further comprises a corresponding plurality of validity fields storing a validity flag.

35. The method of claim 34, further comprising for the read identifying the one of the additional cache way and N cache ways of the N-way set associative memory structure for the read whose validity flag at the validity field identified by the read index portion is valid and is selected by the read encoded tag value.

36. The method of claim 34, further comprising for the write identifying the one of the additional cache way and N cache ways of the N-way set associative memory structure for the write as selected by the write encoded write tag value if no conflict or the substitute encoded tag value if there is conflict.

37. The method of claim 36, further comprising:
comparing the read encoded tag value for the read to the write encoded tag value for the write; and
generating a signal indicative of the conflict when the read and write encoded tag values match.

38. The method of claim 37, further comprising selecting, in response to said signal, between the additional cache way and N cache ways of the N-way set associative memory structure for the write.

39. The method of claim 38, further comprising identifying the one of the additional cache way and N cache ways of the N-way set associative memory structure by finding the cache way having a free data field identified by the write index portion.

40. The method of claim 39, wherein identifying comprises checking for validity flags identified by the write index portion whose value indicates that the corresponding data field contains invalid data.

41. The memory of claim 34, further comprising testing the validity flags identified by the write index portion whose value indicates that the corresponding data field to identify errors with respect to stored tag data.

42. The method of claim 41, further comprising providing a parity bit for the validity flags identified by the write index portion whose value indicates the corresponding data field, and testing the parity bit for error identification.

43. The method of claim 42, wherein the parity bit is calculated for a combination of the validity flags and tag data identified by the write index portion whose value indicates the corresponding data field.

44. The method of claim 25, further comprising initializing the tag memory fields to store initial data values.

45. The method of claim 25, further detecting errors with respect to stored tag data.

46. The method of claim 25, further comprising switching the N-way set-associative memory structure to a one-way set-associative memory structure in response to a mode selection signal.

47. The method of claim 25, further comprising disabling support of the simultaneous read-write operation for the N-way set-associative memory structure in response to a mode selection signal.

48. A cache memory, comprising:
an N-way set-associative memory structure including N cache ways, wherein N is greater than or equal to two, each cache way of the N-way set associative memory structure comprising a plurality of tag memory fields and a corresponding plurality of data fields;
an additional cache way comprising a plurality of tag memory fields and a corresponding plurality of data fields;
a control circuit including multiplexing circuitry coupled to the data fields, said control circuit configured to operate, in an instance of a simultaneous read-write operation defined by a read memory address including a read tag portion and a read index portion, wherein the read tag portion has a value that solely identifies one of the N cache ways of the N-way set associative memory structure, and a write memory address including a write tag portion and a write index portion, wherein the write tag portion has a value that solely identifies one of the N cache ways of the N-way set associative memory, to:
determine a cache hit and control the multiplexing circuitry to effectuate a read from one of the additional cache way and the N cache ways of the N-way set associative memory structure as indicated by the read index portion of the read memory address and an encoded read tag value contained within the corresponding tag memory field in said solely identified one of the N cache ways of the N-way set associative memory structure, said encoded read tag value specifying said one of the additional cache way and the N cache ways of the N-way set associative memory structure for the read;
determine whether a write as indicated by the write index portion of the write memory address and an encoded write tag value contained within the corresponding tag memory field in said solely identified one of the N cache ways of the N-way set associative memory structure, said encoded write tag value specifying one of the additional cache way and the N cache ways of the N-way set associative memory structure for the write, would be made in a same one of the additional cache way and the N cache ways of the N-way set associative memory structure as the read so as to be in conflict; and
with such conflict, control the multiplexing circuitry to effectuate the write, simultaneously with the read, to one of the additional cache way and N cache ways of the N-way set associative memory structure that is identified by a substrate encoded tag value contained in the corresponding tag memory field of the additional cache way.

* * * * *